US009716586B2

(12) United States Patent
Chevallier-Mames et al.

(10) Patent No.: US 9,716,586 B2
(45) Date of Patent: *Jul. 25, 2017

(54) PRECOMPUTING INTERNAL AES STATES IN COUNTER MODE TO PROTECT KEYS USED IN AES COMPUTATIONS

(71) Applicant: Apple Inc., Cupertino, CA (US)

(72) Inventors: Benoit Chevallier-Mames, Paris (FR); Mathieu Ciet, Paris (FR); Thomas Icart, Paris (FR); Bruno Kindarji, Paris (FR); Augustin J. Farrugia, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,223

(22) Filed: Jan. 19, 2016

(65) Prior Publication Data

US 2016/0211972 A1    Jul. 21, 2016

Related U.S. Application Data

(63) Continuation of application No. 14/015,523, filed on Aug. 30, 2013, now Pat. No. 9,264,222.

(60) Provisional application No. 61/770,927, filed on Feb. 28, 2013.

(51) Int. Cl.
*H04L 9/00* (2006.01)
*H04L 9/06* (2006.01)
*H04L 9/30* (2006.01)

(52) U.S. Cl.
CPC .......... *H04L 9/0637* (2013.01); *H04L 9/0631* (2013.01); *H04L 9/30* (2013.01); *H04L 2209/24* (2013.01)

(58) Field of Classification Search
CPC .................................................. H04L 2209/24
USPC .................................. 380/28, 29, 30, 37, 44
See application file for complete search history.

(56) References Cited

U.S. PATENT DOCUMENTS

| | | |
|---|---|---|
| 5,201,000 A | 4/1993 | Matyas et al. |
| 6,628,786 B1 | 9/2003 | Dole |
| 7,177,424 B1 | 2/2007 | Futuya et al. |
| 7,305,084 B2 | 12/2007 | Hawkes |
| 7,694,133 B2 | 4/2010 | Sibert |

(Continued)

FOREIGN PATENT DOCUMENTS

EP    2458774 A1    5/2012

OTHER PUBLICATIONS

Paul, "Cryptanalysis of Stream Ciphers Based on Arrays and Modular Addition", Katholieke Universiteit Leuven, Nov. 2006, 149 pages.*
Eastlake, "Randomness Recommendations for Security", RFC 1750, Dec. 1994, 30 pages.*

(Continued)

*Primary Examiner* — Roderick Tolentino
*Assistant Examiner* — Walter Malinowski
(74) *Attorney, Agent, or Firm* — Blakely, Sokoloff Taylor & Zafman LLP

(57) ABSTRACT

Methods, media, and systems for, in one embodiment, protecting one or more keys in an encryption and/or decryption process can use precomputed values in the process such that at least a portion of the one or more keys is not used or exposed in the process. In one example of a method, internal states of an AES encryption process are saved for use in a counter mode stream cipher operation in which the key used in the AES encryption process is not exposed or used.

25 Claims, 7 Drawing Sheets

(56) References Cited

U.S. PATENT DOCUMENTS

| | | | |
|---|---|---|---|
| 7,739,741 | B2 | 6/2010 | Saffre |
| 7,870,380 | B2 | 1/2011 | VanHeyningen et al. |
| 8,600,049 | B2 | 12/2013 | Gueron et al. |
| 8,605,897 | B2 | 12/2013 | Golic |
| 8,639,947 | B2 | 1/2014 | Elovici et al. |
| 8,862,900 | B2 | 10/2014 | Chen |
| 2002/0012432 | A1* | 1/2002 | England .................. G06F 21/71 380/231 |
| 2002/0071552 | A1 | 6/2002 | Rogaway |
| 2002/0085710 | A1 | 7/2002 | Ananth |
| 2002/0120838 | A1 | 8/2002 | Abdulkader |
| 2002/0176572 | A1 | 11/2002 | Ananth |
| 2003/0081769 | A1* | 5/2003 | Hamilton ........... H04N 1/32144 380/28 |
| 2004/0019785 | A1 | 1/2004 | Hawkes et al. |
| 2004/0042620 | A1 | 3/2004 | Andrews et al. |
| 2004/0083362 | A1 | 4/2004 | Park |
| 2004/0187001 | A1* | 9/2004 | Bousis .................. G06F 21/445 713/175 |
| 2006/0050875 | A1 | 3/2006 | Gammel et al. |
| 2006/0126835 | A1* | 6/2006 | Kim ...................... H04L 9/0637 380/44 |
| 2006/0285684 | A1* | 12/2006 | Rogaway ............. H04L 9/0637 380/37 |
| 2007/0263861 | A1 | 11/2007 | Kiyomoto et al. |
| 2008/0281789 | A1 | 11/2008 | Kao et al. |
| 2009/0103722 | A1* | 4/2009 | Anderson ............. H04L 9/0841 380/44 |
| 2009/0172394 | A1 | 7/2009 | Johnston et al. |
| 2010/0027781 | A1 | 2/2010 | Galbi et al. |
| 2010/0027783 | A1 | 2/2010 | Yup |
| 2010/0058070 | A1 | 3/2010 | Garay et al. |
| 2010/0098244 | A1 | 4/2010 | Ciet et al. |
| 2010/0268960 | A1 | 10/2010 | Moffat et al. |
| 2011/0055558 | A1 | 3/2011 | Liu et al. |
| 2011/0096923 | A1 | 4/2011 | Rollgen |
| 2011/0255689 | A1 | 10/2011 | Bolotov et al. |
| 2012/0002807 | A1 | 1/2012 | Michiels et al. |
| 2012/0087490 | A1 | 4/2012 | Ollikainen et al. |
| 2012/0128153 | A1 | 5/2012 | Golic |
| 2012/0141093 | A1 | 6/2012 | Yamaguchi et al. |
| 2012/0170740 | A1* | 7/2012 | Lee ...................... H04L 9/0618 380/44 |
| 2013/0275758 | A1* | 10/2013 | Marlow ................ H04L 9/0841 713/171 |
| 2014/0019502 | A1* | 1/2014 | Goettfert ............... H04L 9/0662 708/252 |
| 2014/0133656 | A1 | 5/2014 | Wurster et al. |
| 2014/0219443 | A1 | 8/2014 | Brainis |

OTHER PUBLICATIONS

Billet, "Cryptanalysis of a White Box AES Implementation", SAC 2004, LNCS 3357, Springer-Verlag, 2005 pp. 227-240.*
Michiels, "Cryptanalysis of White-Box Implementations", Phillips Research Laboratories, International Association for Cryptologic Research, 2008, 14 pages.*
Chow, "White-Box Cryptography and an AES Implementation", Proceeding SAC '02 Revised Papers from the 9th Annual International Workshop on Selected Areas in Cryptography, 2003, pp. 250-270.*
Shamir, "Playing hide and seek with stored keys", Proceeding FC '99 Proceedings of the Third International Conference on Financial Cryptography, Sep. 22, 1998, pp. 118-124.*
Zola, "Parallel Speculative Encryption of Multiple AES Contexts on GPUs", IEEE, 2012, 9 pages.*
Rogaway, "OCB: A Block-Cipher Mode of Operation for Efficient Authenticated Encryption", CCS'01, Nov. 5-8, 2001, pp. 196-205.*
Wu, "Cryptanalysis and Design of Stream Ciphers", Katholieke Universiteit Leuven, Jul. 2008, 151 pages.
Announcing the Advanced Encryption Standard (AES), Federal Information Processing Standards Publication 197, Nov. 26, 2001.
Using Advanced Encryption Standard (AES) Counter Mode with IPsec Encapsulating Security Payload (ESP), R. Housley, Vigil Security, Jan. 2004.
"Block cipher modes of operation", downloaded from Wikipedia Feb. 22, 2013, http://en.wikipedia.org/wiki/Block_cipher_modes_of_operation.
"Cryptographic nonce", downloaded from Wikipedia on Dec. 19, 2012, http://en.wikipedia.org/wiki/Cryptographic_nonce.
AES Counter Mode details (Intel AES-NI implementation), submitted by Nicolae Popovic on Nov. 11, 2011, http://software.intel.com/en-us/blogs/2011/11/11/aes-counter-mode-details-intel-aes-ni-implementation.
"Advanced Encryption Standard", downloaded from Wikipedia Feb. 22, 2013, http://en.wikipedia.org/wiki/Advanced_Encryption_Standard.
Patrick P. Tsang, Sean W. Smith, "Secure Cryptographic Precomputation with Insecure Memory", 2007.
Weidong Shi et al., High Efficiency Counter Mode Security Architecture via Prediction and Precomputation, Proceedings of the 32$^{nd}$ International Symposium on Computer Architecture (ISCA '05), IEEE 2005.
Morris Dworkin, "Computer Security", "Recommendation for Block Cipher Modes of Operation, Methods and Techniques", NIST Special Publication 800-38A, Dec. 2001.
Elaine Barker et al., "Computer Security—Recommendation for Cryptographic Key Generation, NIST Special Publication 800-133", Nov. 2012.

* cited by examiner

Counter (CTR) mode encryption

US 9,716,586 B2

PRECOMPUTING INTERNAL AES STATES IN COUNTER MODE TO PROTECT KEYS USED IN AES COMPUTATIONS

This application is a continuation of co-pending U.S. application Ser. No. 14/015,523 filed on Aug. 30, 2013, now issued as U.S. Pat. No. 9,264,222, which claims the benefit of U.S. provisional patent application No. 61/770,927, filed on Feb. 28, 2013, which application is incorporated herein by reference.

BACKGROUND

The present invention relates to the field of cryptography.

In the field of cryptography, there is a large use of symmetric algorithms, such as the algorithm known as AES (Advanced Encryption Standard—see Federal Information Processing Standards Publication 197 issued by the U.S. National Institute of Standards and Technology at http://csrc.nist.gov/publications/fips/fips197/fips-197.pdf). A symmetric encryption/decryption uses a key to encrypt a message (sometimes referred to as "plaintext") and uses the same key to decrypt the encrypted message (sometimes referred to as "ciphertext"). A symmetric encryption/decryption algorithm, such as AES, takes a set of two inputs of given and fixed sizes: key and message. However, in practice it is necessary to be able to encrypt larger elements than the fixed size for the message, and various modes of encryption have been designed to allow for encryption/decryption of large messages such as a stream of content (e.g., a movie or song, etc.). There are several known modes of encryption/decryption, including the ECB mode and the CBC mode and counter (CTR) mode. The present description primarily relates to the counter mode of operation.

FIGS. 1A and 1B respectively show how encryption and decryption are performed in the counter mode of operation. A block cipher, such as the AES algorithm, is used to encrypt a seed (such as a nonce) with a given key, and the result of the encryption is XORed (exclusive OR operation) with the original message (referred to as "plaintext" in FIG. 1A) to produce the encrypted value for this block of plaintext. The seed is then updated (by a counter value) before each next encryption in which the updated seed (also referred to as an updated nonce) is encrypted with the key and the result is XORed with the next block of plaintext. The method repeats for each block of plaintext in the stream of plaintext. In an implementation using AES in the counter mode of operation, a 16 byte (B) buffer (the current nonce) is encrypted using the AES algorithm (which is a block cipher algorithm) and a key, and the encrypted buffer is then XORed to a 16B block of plaintext to produce a 16B block of ciphertext. This process is repeated for all of the 16B plaintext blocks to get all of the 16B ciphertext blocks. The counter mode for decryption is shown in FIG. 1B and involves the same operations done in encryption in that a nonce is encrypted with the key and the result is XORed, but in the case of decryption the result is XORed with a block of ciphertext, and the decryption process is repeated for each block of ciphertext. The decryption process requires the use of the key and the starting nonce, which can be updated by a counter value for each block. Thus, the decryption process potentially exposes the key and the nonce to an attacker who can attempt to steal the key for unauthorized uses of the content. Thus, there is a need to protect the key.

SUMMARY OF THE DESCRIPTION

The various embodiments described herein can provide improved protection and security for keys used in a counter mode of operation, particularly for AES encryption in a counter mode of operation. In one embodiment, at least a portion of the key used in the AES encryption algorithm is hidden by precomputing internal states within the AES algorithm; the internal states that are precomputed can be limited to those internal states that are calculated by using the key to derive the internal state. Once these internal states are calculated for a given key and nonce, these internal states can be saved for later use and at least a portion of the key is not needed for later encryption or decryption operations. Thus, those portions of the key can be kept secret and not exposed during the later encryption or decryption operation. The precomputed internal states can be saved and then used to calculate external output states in the later encryption or decryption operations; the external output states are those values outputted from, for example, the AES encryption algorithm that are XORed with either a plaintext block (in the case of encryption) or a ciphertext block (in the case of decryption). An external output state is an output from a block cipher algorithm that uses various internal states to derive the output. The precomputed internal states can be used to calculate external output states for a key stream that can be used to encrypt plaintext or decrypt cipher text. The precomputed internal states can be precomputed for an unknown length of plaintext or ciphertext that, in one embodiment, is less than a predetermined maximum length. The unknown length can be, in one embodiment, arbitrary as long as it is less than or equal to the predetermined maximum length. For example, it can be assumed, in one embodiment, that the plaintext or ciphertext is not larger than 32 GB (Gigabytes) in length.

The precomputed internal states can be stored at a server and then used at the server (or used at another server) to encrypt the plaintext (e.g. a movie or song or book or other content) to create ciphertext and then the ciphertext can be transmitted to a client that can decrypt the ciphertext using the precomputed internal states (without having to use at least a portion of the key to decrypt the ciphertext). The client can receive a transmission of the precomputed internal states with the transmission of the ciphertext or at a different time or through a different channel.

A method, according to one embodiment described herein can include: precomputing a set of internal states, within a symmetric key block cipher algorithm in counter mode, using a key and a set of one or more nonces; and storing the precomputed set of internal states for use in a later encryption or decryption operation, the later encryption or decryption operating being performed without using or exposing at least a portion of the key and in one embodiment, can be performed without using or exposing any portion of the key. In one embodiment, the later encryption or decryption operation is performed without using or exposing any part of the key. The set of internal states that are precomputed can be those internal states that use the key as an input to an operation, in the symmetric key block cipher algorithm, that produces those internal states, while other internal states can be left for computation during the later encryption or decryption operations. The set of one or more nonces is, in one embodiment, limited to a predetermined value such that the number of nonces in the later encryption or decryption operation is limited (cannot exceed) to the predetermined value that is related to a maximum plaintext length having a maximum number of blocks. In one embodiment, the symmetric key block cipher algorithm can be the Advanced Encryption Standard (AES), and the storing of the precomputed set of internal states does not store any external output state for any nonce in the set of one or more nonces. The later encryption or decryption operation, in one embodiment, computes the external state for a particular nonce and then (1) encrypts a plaintext block by XORing (performing an exclusive OR logic operation) the plaintext block with the external state for the particular nonce, or (2) decrypts a ciphertext block by XORing the ciphertext block with the external state for the particular nonce. The later encryption or decryption operation can compute the external state for a particular nonce without using any part of the key in one embodiment or without using a portion of the key in another embodiment. In one embodiment, the set of nonces includes an initial nonce (also referred to as a seed), and a plurality of updated nonces are derived from the initial nonce and from a plurality of counter values; in one embodiment, the plurality of counter values are restricted to a predetermined number of least significant bytes (LSB) of the plurality of updated nonces. The restriction to the predetermined number is done, in one embodiment, in order to allow for the precomputation of internal states. In one embodiment, the plurality of updated nonces are computed in the later encryption or decryption operation from the precomputed set of internal states, and the later encryption or decryption operation does not need to compute an updated nonce or seed from an initial nonce.

A method, according to one embodiment performed at a client system, can include the operations of: receiving a precomputed set of internal states, within a symmetric key block cipher algorithm in counter mode, and storing the precomputed set of internal states for use in a decryption operation that is performed without using or exposing at least a portion of a key. The precomputed set of internal states were precomputed using the key and a plurality of nonces; in one embodiment, the number of nonces in the plurality of nonces is limited to a predetermined number in order to allow for the precomputation of the internal states. The client system can compute the external state for a particular nonce by using the internal states to derive the external state and can then decrypt the ciphertext block.

The various methods described herein can be performed in one or more data processing systems that include or use one or more machine readable non-transitory storage media that store executable computer program instructions which, when executed by the one or more data processing systems, cause the one or more systems to perform any one of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

At least some of the various embodiments described herein can provide improved protection and security for keys used in a counter mode of encryption/decryption operations, such as encryption operations using AES encryption in a counter mode of operation. In one embodiment, at least a portion of a key used in an encryption and/or decryption algorithm, such as the AES algorithm, is hidden by precomputing internal states within the algorithm. Once these internal states are calculated for a given key and nonce, these internal states can be saved for later use to encrypt or decrypt content and at least a portion of the key can be hidden (not exposed and not used) in the later use.

Figure 1A:
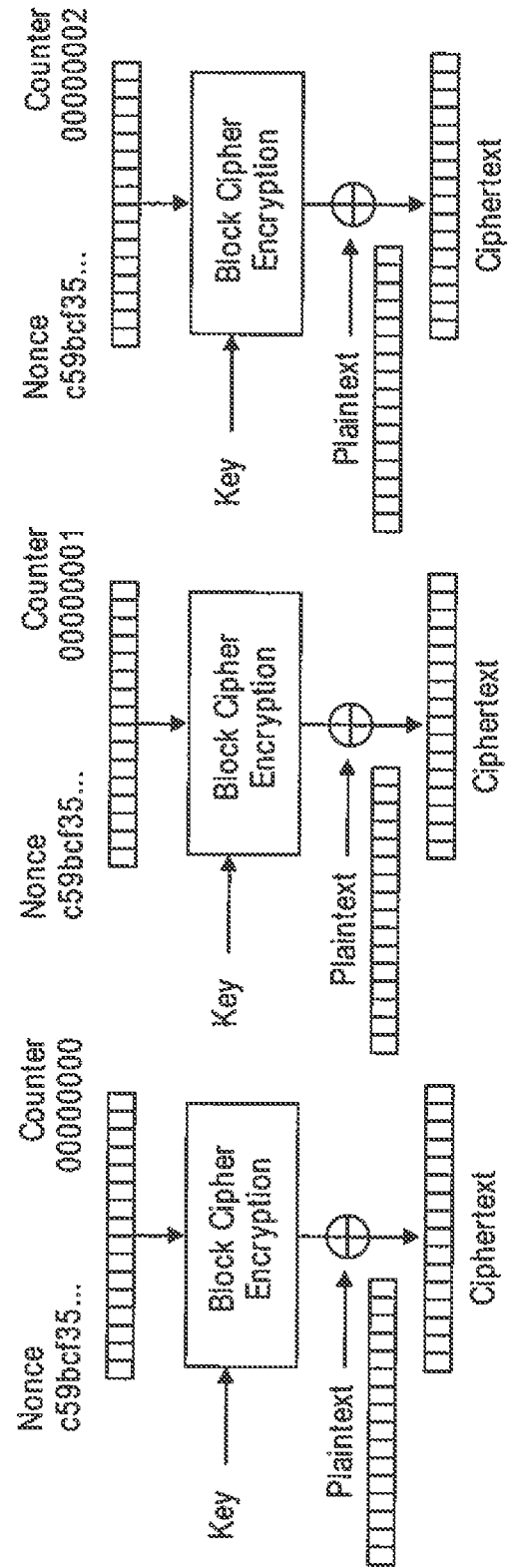
FIG. 1A shows an example of AES (or other block cipher) encryption in the counter mode in the prior art.
Figure 1B:
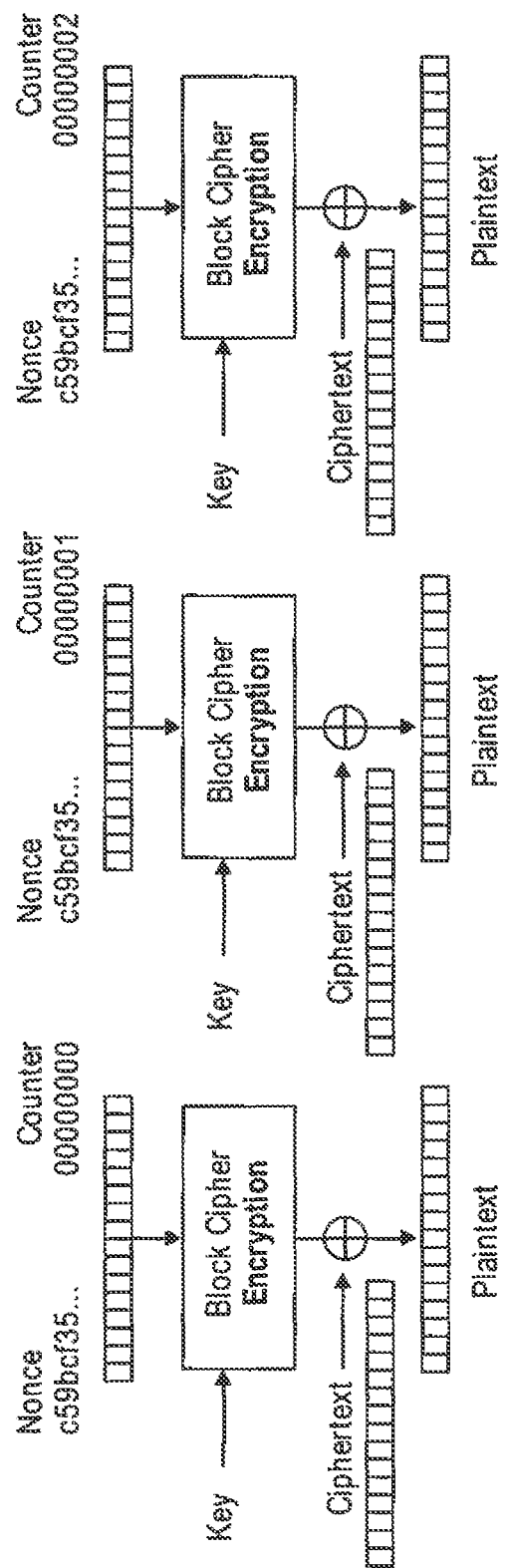
FIG. 1B shows an example of AES (or other block cipher) decryption in the counter mode in the prior art.
Figure 2:
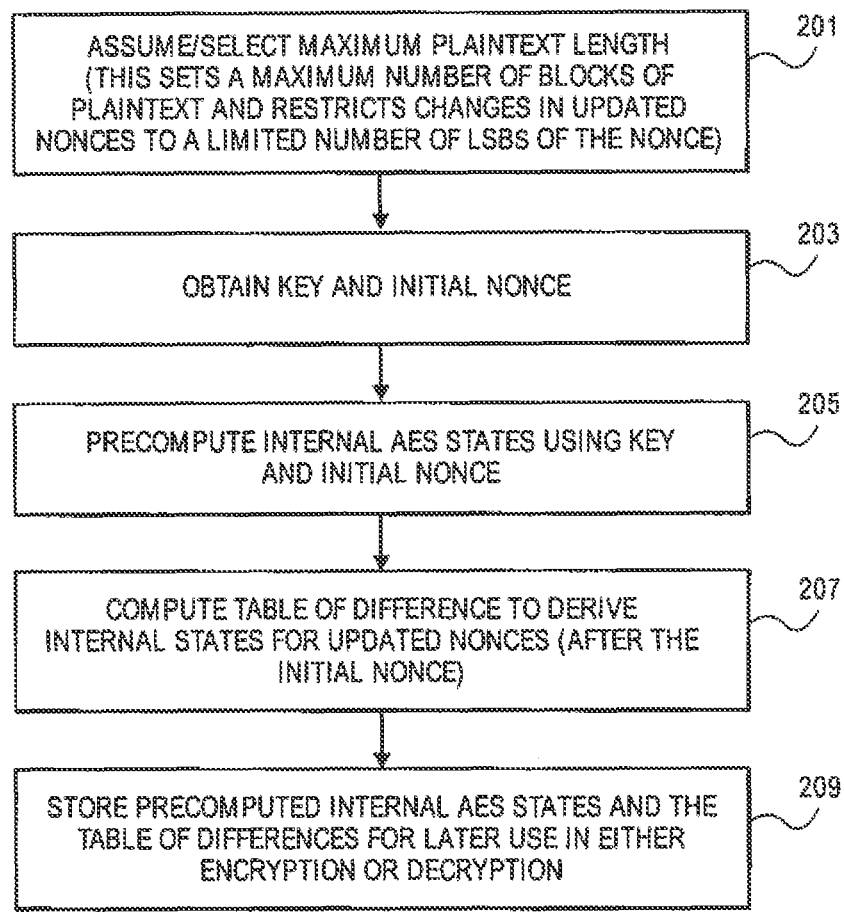
FIG. 2 is a flowchart which shows an example of a method of a precomputational embodiment.

FIG. 2 shows an example of an embodiment in which internal AES states are precomputed in order to hide all, or a portion of, the key used in certain rounds of the AES algorithm. The method shown in FIG. 2 can begin, in operation 201 of FIG. 2, with an assumption about the maximum plaintext length; for example, in one embodiment, the maximum plaintext length (that can be encrypted) can be assumed to be less than 32 Gigabytes (GB) or some other value set by the method. This assumption sets a maximum number of blocks that can be encrypted or decrypted and also limits the number of updated nonces used in the encryption or decryption process. For example, this assumption can restrict changes in the updated nonces to a limited number of bites or bytes of the nonce, such as a certain number of the least significant bits (LSB) of the nonce and this restricts the number of updated nonces to a predetermined number. In one embodiment, this restriction in the portion of the nonce that is updated can allow the method to precompute a set of internal states such that the later encryption or decryption operations do not need to use or expose all of the key in one embodiment or portion of the key in another embodiment. In one embodiment, the method of FIG. 2 takes advantage of the fact that in the encryption or decryption process, the plaintext or the ciphertext is only involved inside a small portion of the process in which the key is not involved, and the method takes advantage of the fact that the updating (e.g., incrementing) of the nonce is a simple additive increment. Referring back to FIG. 2, the method continues in operation 203 in which the key and the initial nonce are obtained; the key can be an AES key and the initial nonce can be a nonce used in the AES algorithm in counter mode. Then in operation 205, internal AES states are precomputed using the key and the initial nonce that were selected in operation 203. Two specific exemplary implementations for precomputing AES internal states are provided below are were also described in U.S. provisional patent application No. 61/770,927, filed on Feb. 28, 2013, which is hereby incorporated herein by reference. One of these specific exemplary implementations (described in Section VI of Appendix A of that U.S. provisional patent application) uses a table (or other data structure) of differences to derive internal states for updated nonces (after the initial nonce) while the other specific exemplary implementation (described in Section V of Appendix A of that U.S. provisional application) does not use such a table of differences. Operation 207 in FIG. 2 is performed in a method that uses the specific exemplary implementation which uses the table of differences, while the other specific exemplary implementation does not perform operation 207. After the internal AES states are precomputed and after the table of differences are precomputed, then in operation 209 these precomputed internal AES states and the precomputed table of differences are stored for later use in either encryption or decryption in the case of the specific exemplary implementation which uses the table of differences. In the case of the specific exemplary implementation which does not use the table of differences, the precomputed internal states are also stored for later use in either encryption or decryption.

Figure 3:
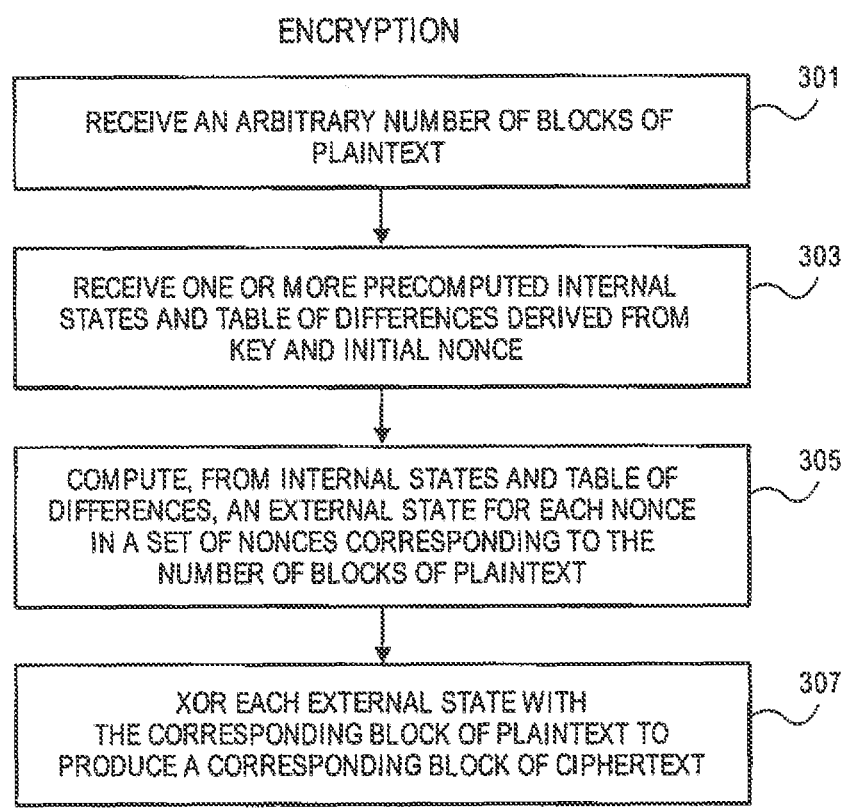
FIG. 3 shows a flowchart that provides an example of a method of an encryption embodiment.

Once the precomputed internal AES states are stored for later use, they can be used to generate external AES states for encryption or decryption using the AES algorithm in a counter mode. FIG. 3 shows an example of a method for encryption using the precomputed internal AES states and the precomputed table of differences which can be precomputed according to the method shown and described relative to FIG. 2. In operation 301, a data processing system receives an arbitrary number of blocks of plaintext; the data processing system can be a server system that receives content (e.g. movies, books, songs, etc.) that is processed as plaintext to be encrypted. The arbitrary number can be any number of blocks (less than the maximum number of blocks if the assumption in 201 in FIG. 2 is used) and can be unknown at the time encryption begins or can be determined at the time encryption begins. If the method for precomputing internal AES states relied upon the assumption (such as the assumption in 201 of FIG. 2) about the maximum number of blocks, the operation 301 can determine the number of blocks in the received plaintext before beginning encryption to ensure that it can finish the encryption process for the entire stream of content. For example, operation 301 can include a method to verify the number of blocks in the plaintext is less than the predetermined number of blocks used in any assumptions relied upon in the process to precompute internal states of an encryption algorithm. In one embodiment, the arbitrary number of blocks in operation 301 can be any number less than the predetermined number set by the maximum number set in the assumption made in operation 201 of FIG. 2. The number of blocks will depend upon the size of the content. In operation 303, the data processing system receives one or more precomputed internal states and one or more table of differences which were derived from at least one key and at least one initial nonce. The data processing system can receive these one or more precomputed internal states and these one or more precomputed table of differences at the time that it receives the blocks of plaintext in operation 301 or can receive these precomputed data significantly well before or after (in time) receiving the blocks of plaintext in operation 301. In one embodiment, the data processing system does not, in operation 303, receive any data about the key used to create the precomputed internal states; in another embodiment, the data processing system receives in operation 303 only a portion of the key (for example, the 12 most significant bytes (MSBs) of the key are not received and are not exposed to the data processing system which performs the encryption while the remainder of the key is received and is exposed to the data processing system which performs the encryption). In operation 305, the data processing system computes, from the internal states and table of differences received in operation 303, an external state for each nonce in a set of nonces corresponding to the number of blocks of plaintext. This description provides a specific exemplary implementation below for computing, from precomputed internal states and a table of differences, an external state for each nonce in such a set of nonces; the exemplary implementation is shown in the form of pseudocode. In the case of streaming content, the external states can be computed in operation 305 one at a time as each block of plaintext is received, and the external state can then be exclusively OR'ed (XOR), in operation 307, with the corresponding block of plaintext to produce the corresponding block of ciphertext. Operations 305 and 307 can be repeated for each subsequent block of plaintext in the set of nonces corresponding to the number of blocks of plaintext.

Figure 4:
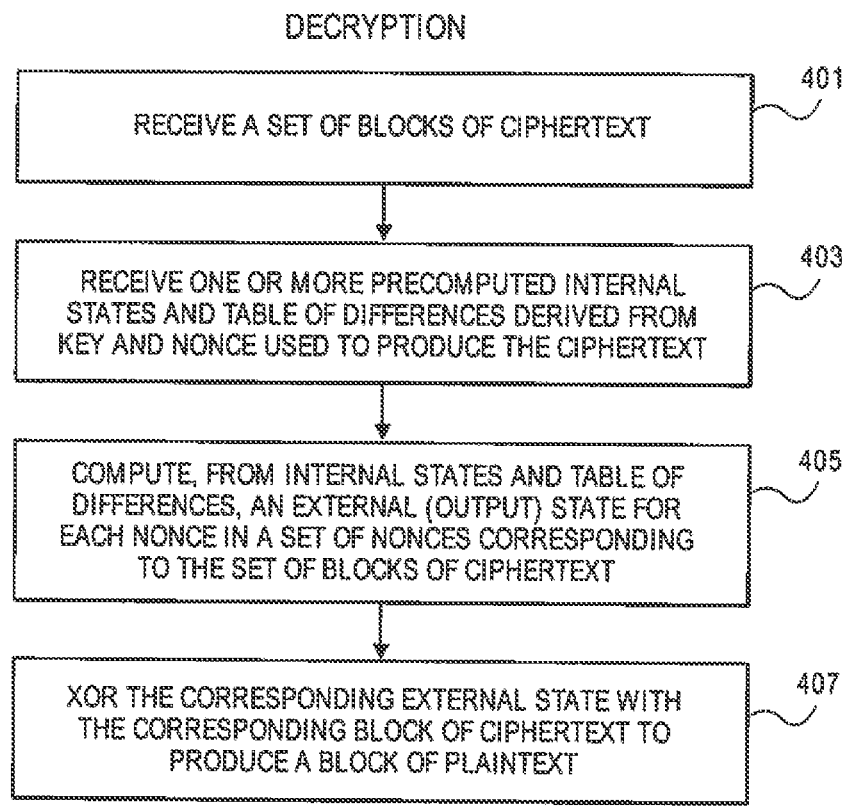
FIG. 4 shows a flowchart that illustrates an example of a method of a decryption embodiment.

FIG. 4 shows an example of a method for decryption using the precomputed internal AES states and the precomputed table of differences that can be precomputed according to the method shown and described relative to FIG. 2. In operation 401, a data processing system receives a set of blocks of ciphertext; the number of blocks in the set can be an arbitrary number (less than the maximum number of blocks if the assumption in operation 201 in FIG. 2 is used) and can be unknown at the time decryption begins or can be determined at the time decryption begins. In operation 403, the data processing system receives one or more precomputed internal states and one or more table of differences which were derived from at least one key and at least one initial nonce. The data processing system can receive these one or more precomputed internal states and these one or more table of differences at the time that it receives the set of blocks of ciphertext in operation 401 or can receive these precomputed data significantly well before or after (in time) receiving the blocks of ciphertext. In one embodiment, the set of blocks of ciphertext and the corresponding set of precomputed data (such as the precomputed data received in operation 403) can be received in different transactions or through different channels or by different types of software in order to protect the encrypted content. In one embodiment, the data processing system does not, in operation 403, receive any data about the key used to create the precomputed internal states; in another embodiment, the data processing system receives in operation 403 only a portion of the key (for example, the 12 most significant bytes of the key are not received and are not exposed to the data processing system which performs the decryption while the remainder of the key is received and is exposed to and is used by the data processing system which performs the decryption). In operation 405, the data processing system computes, from the internal states and the table of differences received in operation 403, an external state for each nonce in a set of nonces corresponding to the number of blocks of ciphertext received in operation 401. This description provides a specific exemplary implementation below for computing, from precomputed internal states and a table of differences, an external state for each nonce in such a set of nonces, and this exemplary implementation is shown in the form of pseudocode. The external state can then be exclusively OR'ed (XOR), in operation 407, with the corresponding block of ciphertext to produce the corresponding block of plaintext. Operations 405 and 407 can be repeated for each block of ciphertext received in operation 401 to produce a corresponding block of plaintext. The resulting plaintext can then be processed according to the type of content embodied in the plaintext; for example, if the plaintext is a streaming movie or video, the movie or video can be presented on a display device and one or more speakers.

Exemplary Implementation

The following sections provide two specific exemplary implementations that are shown in a pseudocode format. A conventional, prior art AES (in counter mode) implementation is also provided in the following sections for the purposes of comparison relative to the two implementations. These specific exemplary implementations are also described in U.S. provisional patent application No. 61/770,927, filed on Feb. 28, 2013, which application is incorporated herein by reference. The first exemplary implementation is described in sections IV and V of Appendix A of that U.S. provisional patent application, and that implementation uses the AES algorithm in counter mode and hides a portion of the key while another portion is exposed and used in the encryption and decryption processes. The second exemplary implementation is described in section VI of Appendix A of that U.S. provisional patent application, and the second exemplary implementation uses the AES algorithm in counter mode and hides all of the key (so none of the key is exposed or used in the encryption and decryption processes, such as the processes shown in FIGS. 3 and 4). The second exemplary implementation uses a table of differences which has been described relative to the methods of FIGS. 3 and 4. The two exemplary implementations and the conventional AES (in counter mode) implementation all use the following data referred to as Te0, Te1, Te2, and Te3 and key; Te0, Te1, Te2 and Te3 are an implementation of the S-box tables used within the AES algorithm and key is an AES key. The data Te0, Te1, Te2, and Te3 and key are set out below:

Te0=[0xc66363a5, 0xf87c7c84, 0xee777799, 0xf67b7b8d,
0xfff2f20d, 0xd66b6bbd, 0xde6f6fb1, 0x91c5c554,
0x60303050, 0x02010103, 0xce6767a9, 0x562b2b7d,
0xe7fefe19, 0xb5d7d762, 0x4dababe6, 0xec76769a,
0x8fcaca45, 0x1f82829d, 0x89c9c940, 0xfa7d7d87,
0xcffafa15, 0xb25959eb, 0x8e4747c9, 0xfbf0f00b,
0x41adadec, 0xb3d4d467, 0x5fa2a2fd, 0x45afafea,
0x239c9cbf, 0x53a4a4f7, 0xe4727296, 0x9bc0c05b,
0x75b7b7c2, 0xe1fdfd1c, 0x3d9393ae, 0x4c26266a,
0x6c36365a, 0x7e3f3f41, 0xf5f7f702, 0x83cccc4f,
0x6834345c, 0x51a5a5f4, 0xd1e5e534, 0xf9f1f108,
0xe2717193, 0xabd8d873, 0x62313153, 0x2a15153f,
0x0804040c, 0x95c7c752, 0x46232365, 0x9dc3c35e,
0x30181828, 0x379696a1, 0x0a05050f, 0x2f9a9ab5,
0x0e070709, 0x24121236, 0x1b80809b, 0xdfe2e23d,
0xcdebcb26, 0x4e272769, 0x7fb2b2cd, 0xea75759f,
0x1209091b, 0x1d83839e, 0x582c2c74, 0x341a1a2e,
0x361b1b2d, 0xdc6e6eb2, 0xb45a5aee, 0x5ba0a0fb,
0xa45252f6, 0x763b3b4d, 0xb7d6d661, 0x7db3b3ce,
0x5229297b, 0xdde3e33e, 0x5e2f2f71, 0x13848497,
0xa65353f5, 0xb9d1d168, 0x00000000, 0xc1eded2c,
0x40202060, 0xe3fcfc1f, 0x79b1b1c8, 0xb65b5bed,
0xd46a6abe, 0x8dcbcb46, 0x67bebed9, 0x7239394b,
0x944a4ade, 0x984c4cd4, 0xb05858e8, 0x85cfcf4a,
0xbbd0d06b, 0xc5efef2a, 0x4faaaae5, 0xedfbfb16,
0x864343c5, 0x9a4d4dd7, 0x66333355, 0x11858594,
0x8a4545cf, 0xe9f9f910, 0x04020206, 0xfe7f7f81,
0xa05050f0, 0x83c3c44, 0x259f9fba, 0x4ba8a8e3,
0xa25151f3, 0x5da3a3fe, 0x804040c0, 0x058f8f8a,
0x3f9292ad, 0x219d9dbc, 0x70383848, 0xf1f5f504,
0x63bcbcdf, 0x77b6b6c1, 0xafdada75, 0x42212163,
0x20101030, 0xe5ffff1a, 0xfd13f30e, 0xbfd2d26d,
0x81cded4c, 0x180c0c14, 0x26131335, 0xe3ecec2f,
0xbe5f5fe1, 0x359797a2, 0x884444cc, 0x2e171739,
0x93c4c457, 0x55a7a7f2, 0xfc7e7e82, 0x7a3d3d47,
0xc86464ac, 0xba5d5de7, 0x3219192b, 0xe6737395,
0xc06060a0, 0x19818198, 0x9e4f4fd1, 0xa3dcdc7f,
0x44222266, 0x542a2a7e, 0x3b9090ab, 0x0b888883,
0x8c4646ca, 0xe7eeee29, 0x6bb8b8d3, 0x2814143c,
0xa7dede79, 0xbc5e5ee2, 0x160b0b1d, 0xaddbdb76,
0xdbc0e03b, 0x64323256, 0x743a3a4e, 0x140a0a1c,
0x924949db, 0x0c06060a, 0x4824246c, 0xb85c5ce4,
0x9fc2c25d, 0xbdd3d36e, 0x43acacef, 0xc46262a6,
0x399191a8, 0x319595a4, 0xd3e4e437, 0xf279798b,
0xd5c7e732, 0x8bc8c843, 0x6e373759, 0xda6d6db7,
0x0185d8d8c, 0xb1d5d564, 0x9c4e4ed2, 0x49a9a9e0,
0xd86c6cb4, 0xac5656fa, 0xf3f4f407, 0xcfeaca25,
0xca6565af, 0xf47a7a8e, 0x47aeace9, 0x1000818,
0x6fbabad5, 0xf078788, 0x4a25256f, 0x5c2e2e72,
0x381c1c24, 0x57a6a6f1, 0x73b4b4c7, 0x97c6c651,
0xcbe8e823, 0xa1dddd7c, 0xe874749c, 0x3e1f1f21,
0x964b4bdd, 0x61bdbddc, 0x0d8b8b86, 0x0f8a8a85,
0xe0707090, 0x7c3e3e42, 0x71b5b5c4, 0xcc6666aa,
0x904848d8, 0x06030305, 0xf7f6f601, 0x1e0e0e12,
0xc26161a3, 0x6a35355f, 0xac5757f9, 0x69b9b9d0,
0x17868691, 0x99c1c158, 0x3a1d1d27, 0x279e9eb9,
0xd9e1e138, 0xebf8f813, 0x2b9898b3, 0x22111133,
0xd26969bb, 0xa9d9d970, 0x078e8e89, 0x339494a7,
0x2d9b9bb6, 0x3c1c1e22, 0x15878792, 0xc9e9e920,
0x87cece49, 0xaa5555f, 0x50282878, 0xa5dfdf7a,
0x038c8c8f, 0x59a1a1f8, 0x09898980, 0x1a0d0d17,
0x65bfbfda, 0xd7e6e631, 0x844242c6, 0xd06868b8,
0x824141c3, 0x299999b0, 0x5a2d2d77, 0x1e0f0f11,
0x7bb0b0cb, 0xa85454fc, 0x6dbbbbd6, 0x2c16163a,]
Te1=[0xa5c66363, 0x84f87c7c, 0x99ee7777, 0x8df67b7b,
0x0dfff2, 0xbdd66b6b, 0xb1de6f6f, 0x5491c5c5,
0x50603030, 0x03020101, 0xa9ce6767, 0x7d562b2b,
0x19e7fefe, 0x62b5d7d7, 0xe64dabab, 0x9aec7676,
0x458fcaca, 0x9d1f8282, 0x4089c9c9, 0x87fa7d7d,
0x15effafa, 0xebb25959, 0xc98e4747, 0x0bfbf0f0,
0xec41adad, 0x67b3d4d4, 0xfd5fa2a2, 0xea45afaf,
0xbf239c9c, 0xf753a4a4, 0x96e47272, 0x5b9bc0c0,
0xc275b7b7, 0x1ce1fdfd, 0xae3d9393, 0x6a4c2626,
0x5a6c3636, 0x417e3f3f, 0x02f5f7f7, 0x4f83cccc,
0x5c683434, 0xf451a5a5, 0x34d1e5e5, 0x08f9f1f1,
0x93c27171, 0x73abd8d8, 0x53623131, 0x3f2a1515,
0x0c080404, 0x5295c7c7, 0x65462323, 0x5e9dc3c3,
0x28301818, 0xa1379696, 0x0f0a0505, 0xb52f9a9a,
0x090e0707, 0x36241212, 0x9b1b8080, 0x3ddfe2e2,
0x26cdebeb, 0x694e2727, 0xcd7fb2b2, 0x9fea7575,
0x1b120909, 0x9e1d8383, 0x74582c2c, 0x2e341a1a,
0x2d361b1b, 0xb2dc6e6c, 0xeeb45a5a, 0xfbb5ba0a0,
0xf6a45252, 0x4d4763b3b, 0x61b7d6d6, 0xce7db3b3,
0x7b522929, 0x3edde3e3, 0x715e2f2f, 0x97138484,
0xf5a65353, 0x68b9d1d1, 0x00000000, 0x2cc1eded,
0x60402020, 0x1fe3fcfc, 0xc879b1b1, 0xedb65b5b,
0xbed46a6a, 0x468dcbcb, 0xd967bebe, 0x4b723939, 0xde944a4a, 0xd4984c4c, 0xe8b05858, 0x4a85cfcf,
0x6bbbd0d0, 0x2ac5efef, 0xc54faaaa, 0x16edfbfb,
0xc5864343, 0xd79a4d4d, 0x55663333, 0x94118585,
0xcfBa4545, 0x10e919f9, 0x06040202, 0xB1fe7f7f,
0xf0a05050, 0x44783c3c, 0xba259f9f, 0xe34ba8a8,
0xf3a25151, 0xfe5da3a3, 0xc0804040, 0x8a058f8f,
0xad3f9292, 0xbc219d9d, 0x48703838, 0x04f1f5f5,
0xdf63bcbc, 0xc1177b6b6, 0x75afdada, 0x63422121,
0x30201010, 0x1ae5ffff, 0x0efdf3f3, 0x6dbfd2d2,
0x4c81cded, 0x14180c0c, 0x35261313, 0x2fc3ccc,
0xe1be5f5f, 0xa23, 0xcc884444, 0x392e1717,
0x5793c4c4, 0xf255a7a7, 0x82fc7e7c, 0x477a3d3d,
0xacc86464, 0xe7ba5d5d, 0x2b321919, 0x95e67373,
0xa0c06060, 0x98198181, 0xd19e4f4f, 0x7fa3dcdc,
0x66442222, 0x7e542a2a, 0xab3b9090, 0x830b588,
0xca8c4646, 0x29c7ecec, 0xd36bb8b8, 0x3c281414,
0x79a7dede, 0xc2bc5e5e, 0x1d160b0b, 0x76addbdb,
0x3bdbe0e0, 0x56643232, 0x4e743a3a, 0x1e140a0a,
0xdb924949, 0x0a0c0606, 0x6c482424, 0xe4b85c5c,
0x5d9fc2c2, 0x6cbdd3d3, 0xef43acac, 0xa6c46262,
0xa8399191, 0xa4319595, 0x37d3e4e4, 0x8bf27979,
0x32d5c7c7, 0x438bc8c8, 0x596e3737, 0xb7da6d6d,
0x8c018d8d, 0x64b1d8d8, 0xd29c4e4e, 0xc049a9a9,
0xb4d86c6c, 0xfaac5656, 0x07f3f4f4, 0x25cfeaca,
0xafca6565, 0x8ef47a7a, 0xe947aeae, 0x18100808,
0xd561baba, 0x88107878, 0x6f4a2525, 0x725c2c2c,
0x24381c1c, 0xf157a6a6, 0xc773b4b4, 0x5197c6c6,
0x23cbe8e8, 0x7ca1dddd, 0x9cc87474, 0x213e1f1f,
0xdd964b4b, 0xdc61bdbd, 0x860dBb8b, 0x8508a8a,
0x90e07070, 0x427c3e3e, 0xc471b5b5, 0xaacc6666,
0xd8904848, 0x05060303, 0x01f7tf6f, 0x121c0e0c,
0xa3c26161, 0x5f6a3535, 0xf9ae5757, 0xd069b9b9,
0x91178686, 0x5899c1c1, 0x273a1d1d, 0xb9279e9e,
0x38d91c1, 0x13ebf8f8, 0xb32b9898, 0x332211111,
0xbbd26969, 0x70a9d9d9, 0x89078e8e, 0xa7339494,
0xb62d9b9b, 0x223c1c1e, 0x92158787, 0x20c9e9c9,
0x4987cce, 0xf1aa5555, 0x78502828, 0x7aa5fdfd,
0x8f038c8c, 0xf859a1a1, 0x80098989, 0x171a0d0d,
0xda65bfbf, 0x31d7e6e6, 0xc6844242, 0xb8d06868,
0xc3824141, 0xb0299999, 0x775a2d2d, 0x111e0f0f,
0xcb7bb0b0, 0xfca85454, 0xd66bbbb, 0x3a2c1616,]
Te2=[0x63a5c663, 0x7c84f87c, 0x7799ee77, 0x7b8df67b,
0xf20dfff2, 0x6bbdd66b, 0x6fb1de6f, 0xc55491c5,
0x30506030, 0x01030201, 0x67a9ce67, 0x2b7d562b,
0xfe19e7fe, 0xd762b5d7, 0xabe64dab, 0x769aec76,
0xca458fca, 0x829d1f82, 0xc94089c9, 0x7d87fa7d,
0xfa15effa, 0x59ebb259, 0x47c98c47, 0xf00bfbf0,
0xadec4lad, 0xd467b3d4, 0xa2fd5fa2, 0xafea45af,
0x9ebf239c, 0xa4f753a4, 0x7296e472, 0xc05b9bc0,
0xb7c275b7, 0xfd1ce1fd, 0x93ae3d93, 0x266a4c26,
0x365a6c36, 0x3f417e3f, 0xf702f5f7, 0xcc4f83cc,
0x345c6834, 0xa5f451a5, 0xe534d1e5, 0xf108f9f1,
0x7193e271, 0xd873abd8, 0x31536231, 0x153f2a15,
0x040c0804, 0xc75295c7, 0x23654623, 0xc35e9dc3,
0x18283018, 0x96a13796, 0x050f0a05, 0x9ab52f9a,
0x07090e07, 0x12362412, 0x809b1b80, 0xe23ddfe2,
0xeb26cdeb, 0x27694e27, 0xb2cd7fb2, 0x759fea75,
0x091b1209, 0x839e1d83, 0x2c74582c, 0x1a2e341a,
0x1b2d361b, 0x6eb2dc6e, 0x5aeeb45a, 0xa0fb5ba0,
0x52f6a452, 0x3b4d763b, 0xd661b7d6, 0xb3ce7db3,
0x297b5229, 0xe33edde3, 0x2f715e2f, 0x84971384,
0x53f5a653, 0xd168b9d1, 0x00000000, 0xed2cc1ed,
0x20604020, 0xfc1fe3fc, 0xb1c879b1, 0x5bedb65b,
0x6abed46a, 0xcbc468dcb, 0xbed967be, 0x394b7239,
0x4ade944a, 0x4cd4984c, 0x58e8b058, 0xcf4a85cf,
0xd06bbbd0, 0xef2ac5ef, 0xaae54faa, 0xfb16edfb,
0x43c58643, 0x4dd79a4d, 033556633, 0x85941185, 0x45cf8a45, 0xf910e9f9, 0x02060402, 0x7f81fe7f,
0x50f0a050, 0x3c44783c, 0x9fba259f, 0xa8e34ba8,
0x51f3a251, 0xa3fe5da3, 0x40c08040, 0x8f8a058f,
0x92ad3f92, 0x9dbc219d, 0x38487038, 0xf504f1f3,
0xbedf63bc, 0xb6c177b6, 0xda75afda, 0x21634221,
0x10302010, 0xfff1ae5ff, 0xf30efdf3, 0xd26dbfd2,
0xcd4c81cd, 0x0c14180c, 0x13352613, 0xec2fc3ec,
0x5fe1be5f, 0x97a23597, 0x44cc8844, 0x17392e17,
0xc45793c4, 0xa7f255a7, 0x7e82fc7e, 0x3d477a3d,
0x64acc864, 0x5de7ba5d, 0x192b3219, 0x7395e673,
0x60a0c060, 0x81981981, 0x4fd19e4f, 0xdc7fa3dc,
0x22664422, 0x2a7e542a, 0x90ab3b90, 0x88830b88,
0x46ca8c46, 0xee29c7ce, 0xb8d36bb8, 0x143c2814,
0xde79a7de, 0x5ec2bc5e, 0x0b1d160b, 0xdb76addb,
0xe03bdbe0, 0x32566432, 0x3a4e743a, 0x0a1e140a,
0x49db9249, 0x060a0c06, 0x246c4824, 0x8ce4b85c,
0xc25d9fc2, 0xd36cbdd3, 0xacef43ac, 0x62a6c462,
0x91a83991, 0x95a43195, 0xc437d3c4, 0x798bf279,
0xe732d5e7, 0xc8438bc8, 0x37596e37, 0x6db7da6d,
0x8d8c018d, 0xd564b1d5, 0x4ed29c4e, 0xa9e049a9,
0x6cb4d86c, 0x56faac56, 0xf407f3f4, 0xea25cfea,
0x65afca65, 0x7a8ef47a, 0xaec947ae, 0x08181008,
0xbad56fba, 0x7888f078, 0x256f4a25, 0x2e725c2e,
0x1c24381c, 0xa6f157a6, 0xb4c773b4, 0xc65197c6,
0xe823cbe8, 0xdd7ca1dd, 0x749ce874, 0x1f213e1f,
0x4bdd964b, 0xbddc61bd, 0x8b860d8b, 0x8a850f8a,
0x7090e070, 0x3e427c3e, 0xb58c471b5, 0x66aacc66,
0x48d89048, 0x03050603, 0xf601f7f6, 0x0c121c0e,
0x61a3c261, 0x355f6a35, 0x57f9ae57, 0xb9d069b9,
0x86911786, 0xe15899c1, 0x1d273a1d, 0x9eb9279e,
0xe138d9e1, 0xf813cbf8, 0x98b32b98, 0x111332211,
0x69bbd269, 0xd970a9d9, 0x8c89078c, 0x94a73394,
0x9bb62d9b, 0x1e223c1e, 0x87921587, 0xe920c9e9,
0xce4987ce, 0x55ffaa55, 0x28785028, 0xdf7aa5df,
0x8c8f038c, 0xa1f859a1, 0x89800989, 0x0d171a0d,
0xbfda65bf, 0xe631d7e6, 0x42c68442, 0x68b8d068,
0x41c38241, 0x99b02999, 0x2d775a2d, 0x0f111e0f,
0xb0cb7bb0, 0x54fca854, 0xbbd66dbb, 0x163a2c16,]
Te3=[0x6363a5c6, 0x7c7c84f8, 0x777799cc, 0x7b7b8df6,
0xf2f20dff, 0x6b6bbdd6, 0x6f6fb1 de, 0xc5c55491,
0x30305060, 0x01010302, 0x6767a9ce, 0x2b2b7d56,
0xfefefe19e7, 0xd7d762b5, 0xababe64d, 0x76769aec,
0xcaca458f, 0x82829d1f, 0xc9c94089, 0x7d7d87fa,
0xfafa15ef, 0x5959ebb2, 0x4747c98e, 0xf0f00bfb,
0xadadec41, 0xd4d4467b3, 0xa2a2fd5f, 0xafafea45,
0x9c9cbf23, 0xa4a4f753, 0x727296e4, 0xc0c05b9b,
0xb7b7c275, 0xfdfdf1ce1, 0x9393ae3d, 0x26266a4c,
0x36365a6c, 0x3f3f417e, 0x17f7025, 0xcccc4f83,
0x34345c68, 0xa5a5f451, 0xe5e5534d1, 0xf1f108f9,
0x717193e2, 0xd8d8873ab, 0x31315362, 0x15153f2a,
0x00404008, 0xc7c7c75295, 0x23236546, 0xc3c35e9d,
0x18182830, 0x9696a 137, 0x05050f0a, 0x9a9ab52f,
0x0707090e, 0x12123624, 0x809b1b, 0xe2e23ddf,
0xebeb26cd, 0x2727694e, 0xb2b2cd7f, 0x75759fea,
0x09091b12, 0x83839e1d, 0x2c2c7458, 0x1a1a2e34,
0x1b1b2d36, 0x6e6eb2dc, 0x5a5aeeb4, 0xa0a0fb5b,
0x5252f6a4, 0x3b3b4d76, 0xd6d661b7, 0xb3b3ce7d,
0x29297b52, 0xe3e33edd, 0x2f2f715e, 0x84849713,
0x5353f5a6, 0xd1d168b9, 0x00000000, 0xeded2cc1,
0x20206040, 0xfefe1fe3, 0xb1b1c879, 0x5b5bedb6,
0x6a6abed4, 0xcbcb468d, 0xbebed967, 0x39394b72,
0x4a4ade94, 0x4c4cd498, 0x5858e8b0, 0xefcf4a85,
0xd0d06bbb, 0xefefef2ac5, 0xaaaaae54f, 0xfbfb16ed,
0x4343c586, 0x4d4d79a, 0x33335566, 0x85859411,
0x4545cf8a, 0xf9f910e9, 0x02020604, 0x7f7f81 fe,
0x5050f0a0, 0x3c3c4478, 0x919fba25, 0xa8a8e34b,
0x5151 f3a2, 0xa3a3fe5d, 0x4040c080, 0x8f8f8a05, 0x9292ad3f, 0x9d9dbc21, 0x38384870, 0x1f5104f1,
0xbcbcdf63, 0xb6b6c177, 0xdada75af, 0x21216342,
0x10103020, 0xffff1ae5, 0xf3f30efd, 0xdd2d26dbf,
0xcdcd4c81, 0x0c0c1418, 0x13133526, 0xecec2fc3,
0x5f5fe1be, 0x9797a235, 0x4444cc88, 0x1717392e,
0xc4c45793, 0xa7a7f255, 0x7e7e82fc, 0x3d3d477a,
0x6464acc8, 0x5d5de7ba, 0x19192b32, 0x737395e6,
0x6060a0c0, 0x81819819, 0x4f4fd19e, 0xdcdc7fa3,
0x22226644, 0x2a2a7e54, 0x9090ab3b, 0x8888830b,
0x4646ca8c, 0xecee29c7, 0xb8b8d36b, 0x14143c28,
0xdede79a7, 0x5e5ee2bc, 0x0b0b1d16, 0xdbdb76ad,
0xe0e03bdb, 0x32325664, 0x3a3a4e74, 0x0a0a1e14,
0x4949db92, 0x06060a0c, 0x24246c48, 0x5c8ce4b8,
0xc2c25d9f, 0xd3d36ebd, 0xacacef43, 0x6262a6c4,
0x9191a839, 0x9595a431, 0xe4e437d3, 0x79798bf2,
0xe7e732d5, 0xc8c8438b, 0x3737596e, 0x6d6db7da,
0x8d8d8c01, 0xd5d564b1, 0x4e4ed29c, 0xa9a9e049,
0x6c6cb4d8, 0x5656faac, 0xf4f407f3, 0xeaea25cf,
0x6565afca, 0x7a7a8ef4, 0xaeaec947, 0x08081810,
0xbabad56f, 0x787888f0, 0x25256f4a, 0x2e2e725c,
0x1c1c2438, 0xa6a6f157, 0xb4b4c773, 0xc6c65197,
0xc8e823cb, 0xdddd7ca1, 0x74749ce8, 0x1f1f213e,
0x4b4b4d96, 0xbdbddc61, 0x8b8b860d, 0x8a8a850f,
0x707090e0, 0x3c3c427c, 0xb5b5c471, 0x6666aacc,
0x4848d890, 0x03030506, 0xf6f601f7, 0x0e0e121c,
0x6161a3c2, 0x35355f6a, 0x575719ac, 0xb9b9d069,
0x86869117, 0xc1c15899, 0x1d1d273a, 0x9e9eb927,
0xe1e138d9, 0xf8f813eb, 0x9898b32b, 0x11113322,
0x6969bbd2, 0xd9d970a9, 0x8c8c8907, 0x9494a733,
0x9b9bb62d, 0xe1e223c, 0x87879215, 0xe9e920c9,
0xcece4987, 0x5555faa, 0x28287850, 0xdfdf7aa5,
0x8c8c8f03, 0xa1a1f859, 0x89898009, 0x0d0d171a,
0xbfbfda65, 0xe6e631d7, 0x4242c684, 0x6868b8d0,
0x4141c382, 0x9999b029, 0x2d2d775a, 0x0f0f111e,
0xb0b0cb7b, 0x5454fca8, 0xbbbbd66d, 0x16163a2c,]
Original key is 0x00000000, 0x00000000, 0x00000000,
0x00000000, KeyShcheduled=[0x00000000,
0x000000000, 0x00000000, 0x00000000, 0x62636363,
0x62636363, 0x62636363, 0x62636363, 0x9b9898c9,
0xf9fbfbaa, 0x9b9898c9, 0xf9fbfbaa, 0x90973450,
0x696ccffa, 0xf2f45733, 0x0b0fac99, 0xe6da7b,
0x876a1581, 0x759e42b2, 0x7e91ee2b, 0x7f2e2b88,
0x8443e09, 0x8dda7cbb, 0xf34b9290, 0xec614b85,
0x1425758c, 0x99ff0937, 0x6ab49ba7, 0x21751787,
0x3550620b, 0xacaf6b3c, 0xc61bf09b, 0x0ef90333,
0x3ba96138, 0x97060a04, 0x511dfa9f, 0xb1d4d8e2,
0x8a7db9da, 0x1d7bb3de, 0x4c664941, 0xb4ef5bcb,
0x3e92e211, 0x23e951cf, 0x6f8f188e,]

Conventional AES Algorithm in Counter Mode

The following section provides an implementation for a conventional AES algorithm in counter mode; as with the two exemplary implementations, "in" is the nonce, "out" is the external state outputted from the algorithm and "key" is the AES key. This implementation of the conventional AES algorithm uses three (3) functions: "AES_ENC (In, Out, key)"; and "IncrementSeed(Seed)"; and "AES_CTR_MODE(key,Seed,Input,Output,Len)". For example, in the listing below, "def AES_ENC (In, Out, Key):" defines an AES encryption function and the function includes known operators (such as "<<", etc.) and expressions in the Python language. The listings below are written in the Python language. The notation "\" is meant to indicate a new line; in other words (for example), the expression $$a = b + \backslash$$
$$c$$

is equivalent to the expression "a=b+c". No precomputation of internal states of the AES algorithm is performed in this conventional approach shown in this listing.

```
def AES_ENC(In, Out, Key):
    s0 = (In[0] << 24) ^ (In[1] << 16) ^ (In[2] << 8) ^ (In[3])
    s1 = (In[4] << 24) ^ (In[5] << 16) ^ (In[6] << 8) ^ (In[7])
    s2 = (In[8] << 24) ^ (In[9] << 16) ^ (In[10] << 8) ^ (In[11])
    s3 = (In[12] << 24) ^ (In[13] << 16) ^ (In[14] << 8) ^ (In[15])
    s0 = s0 ^ Key[0]
    s1 = s1 ^ Key[1]
    s2 = s2 ^ Key[2]
    s3 = s3 ^ Key[3]
    for i in range(9):
        t0 = Te0[s0 >> 24] ^ Te1[(s1 >> 16) & 0xff] ^ Te2[(s2 >>
8) & 0xff] ^ Te3[s3 & 0xff] ^ Key[ 0 + (i + 1) * 4];
        t1 = Te0[s1 >> 24] ^ Te1[(s2 >> 16) & 0xff] ^ Te2[(s3 >>
8) & 0xff] ^ Te3[s0 & 0xff] ^ Key[ 1 + (i + 1) * 4];
        t2 = Te0[s2 >> 24] ^ Te1[(s3 >> 16) & 0xff] ^ Te2[(s0 >>
8) & 0xff] ^ Te3[s1 & 0xff] ^ Key[ 2 + (i + 1) * 4];
        t3 = Te0[s3 >> 24] ^ Te1[(s0 >> 16) & 0xff] ^ Te2[(s1 >>
8) & 0xff] ^ Te3[s2 & 0xff] ^ Key[ 3 + (i + 1) * 4];
        s0 = t0
        s1 = t1
        s2 = t2
        s3 = t3
    s0 = (Te2[(t0 >> 24)  ] & 0xff000000) ^ \
         (Te3[(t1 >> 16) & 0xff] & 0x00ff0000) ^ \
         (Te0[(t2 >> 8) & 0xff] & 0x0000ff00) ^ \
         (Te1[(t3     ) & 0xff] & 0x000000ff) ^ Key[40];
    s1 = (Te2[(t1 >> 24)  ] & 0xff000000) ^ \
         (Te3[(t2 >> 16) & 0xff] & 0x00ff0000) ^ \
         (Te0[(t3 >> 8) & 0xff] & 0x0000ff00) ^ \
         (Te1[(t0     ) & 0xff] & 0x000000ff) ^ Key[41];
    s2 = (Te2[(t2 >> 24)  ] & 0xff000000) ^ \
         (Te3[(t3 >> 16) & 0xff] & 0x00ff0000) ^ \
         (Te0[(t0 >> 8) & 0xff] & 0x0000ff00) ^ \
         (Te1[(t1     ) & 0xff] & 0x000000ff) ^ Key[42];
    s3 = (Te2[(t3 >> 24)  ] & 0xff000000) ^ \
         (Te3[(t0 >> 16) & 0xff] & 0x00ff0000) ^ \
         (Te0[(t1 >> 8) & 0xff] & 0x0000ff00) ^ \
         (Te1[(t2     ) & 0xff] & 0x000000ff) ^ Key[43];
    for i in range(4):
        Out[0 + i] = (s0 >> (8 * (3 - i))) & 0xFF
        Out[4 + i] = (s1 >> (8 * (3 - i))) & 0xFF
        Out[8 + i] = (s2 >> (8 * (3 - i))) & 0xFF
        Out[12 + i] = (s3 >> (8 * (3 - i))) & 0xFF
    return
def IncrementSeed(Seed):
    for i in range(15):
        Seed[15 - i] = Seed[15 - i] + 1
        if (Seed[15 - i] != 0);
            return
def AES_CTR_MODE(Key, Seed, Input, Output, Len):
    tmpOut = range(16)
    for i in range(Len / 16):
        AES_ENC(Seed, tmpOut, Key)
        IncrementSeed(Seed)
        for j in range(16):
            Output[j + 16 * i] = Input[j + 16 * i] ^ tmpOut[j]
    return
```

First Exemplary Implementation

This section provides an example of an implementation in which a portion of the AES key is hidden during encryption and decryption. This implementation uses four (4) functions: "AES_PRECOMPUTSATION_SECTIONV(In, NextState32B, key)"; and "AES_ENC_PRECOMPSUTA-TION_SECTIONV(In, NextState32B, Out, Key)"; and "IncrementSeed(Seed)"; and "AES_CTR_MODE_PRE-COMPUTSATION_SECTIONV(Key, Seed, NextState32B, Input, Output, Len)". The function "AES_PRECOMPUT-SATION_SECTIONV(In, NextState32B, Key)" precomputes an internal state referred to as NextState32B; the values of NextState32B for a key being all 0 and a seed (nonce) being all 0 are:
[1650697670, 1655031395, 2764464995, 3345179557]

This exemplary implementation is provided and shown in the following pseudocode.

```
def AES_PRECOMPUTSATION_SECTIONV(In, NextState32B, Key):
    s0 = (In[0] << 24) ^ (In[1] << 16) ^ (In[2] << 8) ^ (In[3])
    s1 = (In[4] << 24) ^ (In[5] << 16) ^ (In[6] << 8) ^ (In[7])
    s2 = (In[8] << 24) ^ (In[9] << 16) ^ (In[10] << 8) ^ (In[11])
    s0 = s0 ^ Key[0]
    s1 = s1 ^ Key[1]
    s2 = s2 ^ Key[2]
    NextState32B[0] = Te0[s0 >> 24] ^ Te1[(s1 >> 16) & 0xff] ^ Te2[(s2 >> 8) & 0xff] ^ 0 ^ Key[4];
    NextState32B[1] = Te0[s1 >> 24] ^ Te1[(s2 >> 16) & 0xff] ^ 0 ^ Te3[s0 & 0xff] ^ Key[ 5];
    NextState32B[2] = Te0[s2 >> 24] ^ 0 ^ Te2[(s0 >> 8) & 0xff] ^ Te3[s1 & 0xff] ^ Key[ 6];
    NextState32B[3] = 0 ^ Te1[(s0 >> 16) & 0xff] ^ Te2[(s1 >> 8) & 0xff] ^ Te3[s2 & 0xff] ^ Key[ 7];
    return
def AES_ENC_PRECOMPUTSATION_SECTIONV(In, NextState32B, Out, Key):
    s3 = (In[12] << 24) ^ (In[13] << 16) ^ (In[14] << 8) ^ (In[15])
    s3 = s3 ^ Key[3]
    t0 = NextState32B[0] ^ Te3[s3 & 0xff];
    t1 = NextState32B[1] ^ Te2[(s3 >> 8) & 0xff];
    t2 = NextState32B[2] ^ Te1[(s3 >> 16) & 0xff];
    t3 = NextState32B[3] ^ Te0[s3 >> 24];
    s0 = t0
    s1 = t1
    s2 = t2
    s3 = t3
    for i in range(8):
        t0 = Te0[s0 >> 24] ^ Te1[(s1 >> 16) & 0xff] ^ Te2[(s2 >> 8) & 0xff] ^ Te3[s3 & 0xff] ^ Key[ 0 + (i + 2) * 4];
        t1 = Te0[s1 >> 24] ^ Te1[(s2 >> 16) & 0xff] ^ Te2[(s3 >> 8) & 0xff] ^ Te3[s0 & 0xff] ^ Key[ 1 + (i + 2) * 4];
        t2 = Te0[s2 >> 24] ^ Te1[(s3 >> 16) & 0xff] ^ Te2[(s0 >> 8) & 0xff] ^ Te3[s1 & 0xff] ^ Key[ 2 + (i + 2) * 4];
        t3 = Te0[s3 >> 24] ^ Te1[(s0 >> 16) & 0xff] ^ Te2[(s1 >> 8) & 0xff] ^ Te3[s2 & 0xff] ^ Key[ 3 + (i + 2) * 4];
        s0 = t0
        s1 = t1
        s2 = t2
        s3 = t3
    s0 = (Te2[(t0 >> 24) ] & 0xff000000) ^ \
         (Te3[(t1 >> 16) & 0xff] & 0x00ff0000) ^ \
         (Te0[(t2 >> 8) & 0xff] & 0x0000ff00) ^ \
         (Te1[(t3    ) & 0xff] & 0x000000ff) ^ Key[40];
    s1 = (Te2[(t1 >> 24) ] & 0xff000000) ^ \
         (Te3[(t2 >> 16) & 0xff] & 0x00ff0000) ^ \
         (Te0[(t3 >> 8) & 0xff] & 0x0000ff00) ^ \
         (Te1[(t0    ) & 0xff] & 0x000000ff) ^ Key[41];
    s2 = (Te2[(t2 >> 24) ] & 0xff000000) ^ \
         (Te3[(t3 >> 16) & 0xff] & 0x00ff0000) ^ \
         (Te0[(t0 >> 8) & 0xff] & 0x0000ff00) ^ \
         (Te1[(t1    ) & 0xff] & 0x000000ff) ^ Key[42];
    s3 = (Te2[(t3 >> 24) ] & 0xff000000) ^ \
         (Te3[(t0 >> 16) & 0xff] & 0x00ff0000) ^ \
         (Te0[(t1 >> 8) & 0xff] & 0x0000000) ^ \
         (Te1[(t2    ) & 0xff] & 0x000000ff) ^ Key[43];
    for i in range(4):
        Out[0 + i] = (s0 >> (8 * (3 - i))) & 0xFF
        Out[4 + i] = (s1 >> (8 * (3 - i))) & 0xFF
        Out[8 + i] = (s2 >> (8 * (3 - i))) & 0xFF
        Out[12 + i] = (s3 >> (8 * (3 - i))) & 0xFF
    return
def IncrementSeed(Seed):
    for i in range(15):
        Seed[15 - i] = Seed[15 - i] + 1
        if (Seed[15 - i] != 0):
            return
def AES_CTR_MODE_PRECOMPUTSATION_SECTIONV(Key, Seed, NextState32B, Input, Output, Len):
    tmpOut = range(16)
    for i in range(Len / 16):
        AES_ENC_PRECOMPUTSATION_SECTIONV(Seed, NextState32B, tmpOut, Key)
        IncrementSeed(Seed)
        for j in range(16):
            Output[j + 16 * i] = Input[j + 16 * i] ^ tmpOut[j]
    return
```

Second Exemplary Implementation

This section provides an example of an implementation in which a table of differences ("DB_0" through "DB_15") is used and in which all of the AES key is hidden during encryption and decryption. This implementation uses four (4) functions:

```
"AES_PRECOMPUTSATION_TWO_ROUND_SECTION_VI(In, Out, Key)"; and
"AES_PRECOMPUTSATION_SECTION_VI(In,DB_0, ..., DB_15, tmp8B_2, Key)"; and "AES_ENC_PRECOMPUTSATION_SECTION_VI(D,DB_0, ..., DB_15, tmp8B_2, Out, Key)"; and
"AES_CTR_MODE_PRECOMPUTSATION_SECTION_VI(Key, DB_0, ..., DB_15, tmp8B_2, Input, Output, Len)".
def AES_PRECOMPUTSATION_TWO_ROUND_SECTION_VI(In, Out, Key):
    s0 = (In[0] << 24) ^ (In[1] << 16) ^ (In[2] << 8) ^ (In[3])
    s1 = (In[4] << 24) ^ (In[5] << 16) ^ (In[6] << 8) ^ (In[7])
    s2 = (In[8] << 24) ^ (In[9] << 16) ^ (In[10] << 8) ^ (In[11])
    s3 = (In[12] << 24) ^ (In[13] << 16) ^ (In[14] << 8) ^ (In[15])
    s0 = s0 ^ Key[0]
    s1 = s1 ^ Key[1]
    s2 = s2 ^ Key[2]
    s3 = s3 ^ Key[3]
    for i in range(2);
        t0 = Te0[s0 >> 24] ^ Te1[(s1 >> 16) & 0xff] ^ Te2[(s2 >> 8) & 0xff] ^ Te3[s3 & 0xff] ^ Key[ 4 + 4 * i];
        t1 = Te0[s1 >> 24] ^ Te1[(s2 >> 16) & 0xff] ^ Te2[(s3 >> 8) & 0xff] ^ Te3[s0 & 0xff] ^ Key[ 5 + 4 * i];
        t2 = Te0[s2 >> 24] ^ Te1[(s3 >> 16) & 0xff] ^ Te2[(s0 >> 8) & 0xff] ^ Te3[s1 & 0xff] ^ Key[ 6 + 4 * i];
        t3 = Te0[s3 >> 24] ^ Te1[(s0 >> 16) & 0xff] ^ Te2[(s1 >> 8) & 0xff] ^ Te3[s2 & 0xff] ^ Key[ 7 + 4 * i];
        s0 = t0
        s1 = t1
        s2 = t2
        s3 = t3
```

```
        for i in range(4):
            Out[0 + i] = (s0 >> (8 * (3 - i))) & 0xFF
            Out[4 + i] = (s1 >> (8 * (3 - i))) & 0xFF
            Out[8 + i] = (s2 >> (8 * (3 - i))) & 0xFF
            Out[12 + i] = (s3 >> (8 * (3 - i))) & 0xFF
        return
def AES_PRECOMPUTSATION_SECTION_VI(In, DB_0, DB_1, DB_2,
DB_3, DB_4, DB_5, DB_6, DB_7, DB_8, DB_9, DB_10, DB_11, DB_12,
DB_13, DB_14, DB_15, tmp8B_2, Key):
    tmpIn = range(16)
    tmp8B_2D = range(16)
    for i in range(16):
        tmpIn[i] = In[i]
    AES_PRECOMPUTSATION_TWO_ROUND_SECTION_VI(In, tmp8B_2, Key)
    for D in range(256):
        tmpIn[15] = In[15] + D
        AES_PRECOMPUTSATION_TWO_ROUND_SECTION_VI(tmpIn, tmp8B_2D, Key)
        DB_0[D]  = tmp8B_2[0]  ^ tmp8B_2D[0]
        DB_1[D]  = tmp8B_2[1]  ^ tmp8B_2D[1]
        DB_2[D]  = tmp8B_2[2]  ^ tmp8B_2D[2]
        DB_3[D]  = tmp8B_2[3]  ^ tmp8B_2D[3]
        DB_4[D]  = tmp8B_2[4]  ^ tmp8B_2D[4]
        DB_5[D]  = tmp8B_2[5]  ^ tmp8B_2D[5]
        DB_6[D]  = tmp8B_2[6]  ^ tmp8B_2D[6]
        DB_7[D]  = tmp8B_2[7]  ^ tmp8B_2D[7]
        DB_8[D]  = tmp8B_2[8]  ^ tmp8B_2D[8]
        DB_9[D]  = tmp8B_2[9]  ^ tmp8B_2D[9]
        DB_10[D] = tmp8B_2[10] ^ tmp8B_2D[10]
        DB_11[D] = tmp8B_2[11] ^ tmp8B_2D[11]
        DB_12[D] = tmp8B_2[12] ^ tmp8B_2D[12]
        DB_13[D] = tmp8B_2[13] ^ tmp8B_2D[13]
        DB_14[D] = tmp8B_2[14] ^ tmp8B_2D[14]
        DB_15[D] = tmp8B_2[15] ^ tmp8B_2D[15]
    return
def AES_ENC_PRECOMPUTSATION_SECTION_VI(D, DB_0, DB_1, DB_2,
DB_3, DB_4, DB_5, DB_6, DB_7, DB_8, DB_9, DB_10, DB_11, DB_12,
DB_13, DB_14, DB_15, tmp8B_2, Out, Key):
    tmpIn = range(16)
    tmpIn[0]  = tmp8B_2[0]  ^ DB_0[D]
    tmpIn[1]  = tmp8B_2[1]  ^ DB_1[D]
    tmpIn[2]  = tmp8B_2[2]  ^ DB_2[D]
    tmpIn[3]  = tmp8B_2[3]  ^ DB_3[D]
    tmpIn[4]  = tmp8B_2[4]  ^ DB_4[D]
    tmpIn[5]  = tmp8B_2[5]  ^ DB_5[D]
    tmpIn[6]  = tmp8B_2[6]  ^ DB_6[D]
    tmpIn[7]  = tmp8B_2[7]  ^ DB_7[D]
    tmpIn[8]  = tmp8B_2[8]  ^ DB_8[D]
    tmpIn[9]  = tmp8B_2[9]  ^ DB_9[D]
    tmpIn[10] = tmp8B_2[10] ^ DB_10[D]
    tmpIn[11] = tmp8B_2[11] ^ DB_11[D]
    tmpIn[12] = tmp8B_2[12] ^ DB_12[D]
    tmpIn[13] = tmp8B_2[13] ^ DB_13[D]
    tmpIn[14] = tmp8B_2[14] ^ DB_14[D]
    tmpIn[15] = tmp8B_2[15] ^ DB_15[D]
    s0 = (tmpIn[0]  << 24) ^ (tmpIn[1]  << 16) ^ (tmpIn[2]  << 8) ^ (tmpIn[3])
    s1 = (tmpIn[4]  << 24) ^ (tmpIn[5]  << 16) ^ (tmpIn[6]  << 8) ^ (tmpIn[7])
    s2 = (tmpIn[8]  << 24) ^ (tmpIn[9]  << 16) ^ (tmpIn[10] << 8) ^ (tmpIn[11])
    s3 = (tmpIn[12] << 24) ^ (tmpIn[13] << 16) ^ (tmpIn[14] << 8) ^ (tmpIn[15])
    for i in range(7):
        t0 = Te0[s0 >> 24] ^ Te1[(s1 >> 16) & 0xff] ^ Te2[(s2 >> 8) & 0xff] ^ Te3[s3 & 0xff] ^ Key[ 0 + (i + 3) * 4];
        t1 = Te0[s1 >> 24] ^ Te1[(s2 >> 16) & 0xff] ^ Te2[(s3 >> 8) & 0xff] ^ Te3[s0 & 0xff] ^ Key[ 1 + (i + 3) * 4];
        t2 = Te0[s2 >> 24] ^ Te1[(s3 >> 16) & 0xff] ^ Te2[(s0 >> 8) & 0xff] ^ Te3[s1 & 0xff] ^ Key[ 2 + (i + 3) * 4];
        t3 = Te0[s3 >> 24] ^ Te1[(s0 >> 16) & 0xff] ^ Te2[(s1 >> 8) & 0xff] ^ Te3[s2 & 0xff] ^ Key[ 3 + (i + 3) * 4];
        s0 = t0
        s1 = t1
        s2 = t2
        s3 = t3
    s0 = (Te2[(t0 >> 24)     ] & 0xff000000) ^ \
         (Te3[(t1 >> 16) & 0xff] & 0x00ff0000) ^ \
         (Te0[(t2 >>  8) & 0xff] & 0x0000ff00) ^ \
         (Te1[(t3      ) & 0xff] & 0x000000ff) ^ Key[40];
    s1 = (Te2[(t1 >> 24)     ] & 0xff000000) ^ \
         (Te3[(t2 >> 16) & 0xff] & 0x00ff0000) ^ \
```

```
        (Te0[(t3 >> 8) & 0xff] & 0x0000ff00) ^ \
        (Te1[(t0    ) & 0xff] & 0x000000ff)  ^ Key[41];
    s2 = (Te2[(t2 >> 24)   ] & 0xff000000) ^ \
        (Te3[(t3 >> 16) & 0xff] & 0x00ff0000) ^ \
        (Te0[(t0 >> 8) & 0xff] & 0x0000ff00) ^ \
        (Te1[(t1    ) & 0xff] & 0x000000ff)  ^ Key[42];
    s3 = (Te2[(t3 >> 24)   ] & 0xff000000) ^ \
        (Te3[(t0 >> 16) & 0xff] & 0x00ff0000) ^ \
        (Te0[(t1 >> 8) & 0xff] & 0x0000ff00) ^ \
        (Te1[(t2    ) & 0xff] & 0x000000ff)  ^ Key[43];
    for i in range(4):
        Out[0 + i] = (s0 >> (8 * (3 - i))) & 0xFF
        Out[4 + i] = (s1 >> (8 * (3 - i))) & 0xFF
        Out[8 + i] = (s2 >> (8 * (3 - i))) & 0xFF
        Out[12 + i] = (s3 >> (8 * (3 - i))) & 0xFF
    return
def AES_CTR_MODE_PRECOMPUTSATION_SECTION_VI(Key, DB_0,
DB_1, DB_2, DB_3, DB_4, DB_5, DB_6, DB_7, DB_8, DB_9, DB_10, DB_11,
DB_12, DB_13, DB_14, DB_15, tmp8B_2, Input, Output, Len):
    tmpOut = range(16)
    D = 0
    for i in range(Len / 16):
        AES_ENC_PRECOMPUTSATION_SECTION_VI(D, DB_0, DB_1,
DB_2, DB_3, DB_4, DB_5, DB_6, DB_7, DB_8, DB_9, DB_10, DB_11,
DB_12, DB_13, DB_14, DB_15, tmp8B_2, tmpOut, Key)
        D = D + 1
        for j in range(16):
            Output[j + 16 * i] = Input[j + 16 * i] ^ tmpOut[j]
    return
```

The function "AES_PRECOMPUTSATION_SECTION_VI" precomputes the table of differences (DB_0, . . . , DB_15) and the function "AES_ENC_PRECOMPUTSATION_SECTION_VI" uses the precomputed table of differences to perform encryption/decryption. The values of the table of differences for a key being all 0's and a seed being all 0's is:

DB_0=[0, 28, 74, 75, 56, 250, 77, 64, 248, 21, 46, 142, 95, 73, 89, 23, 103, 33, 60, 99, 116, 39, 134, 102, 247, 100, 151, 153, 149, 139, 119, 140, 254, 85, 161, 206, 184, 96, 172, 43, 129, 111, 214, 91, 2, 11, 57, 9, 158, 244, 229, 156, 87, 157, 233, 122, 98, 90, 211, 121, 173, 36, 24, 3, 6, 19, 166, 155, 143, 31, 246, 178, 240, 117, 249, 132, 133, 224, 37, 255, 109, 34, 183, 30, 160, 238, 52, 220, 152, 69, 239, 138, 144, 154, 227, 201, 150, 66, 51, 63, 25, 210, 65, 203, 123, 208, 67, 171, 190, 72, 80, 16, 101, 8, 197, 82, 251, 212, 159, 243, 194, 104, 32, 204, 120, 68, 225, 45, 10, 221, 165, 202, 182, 47, 13, 217, 176, 175, 219, 125, 38, 18, 186, 231, 22, 218, 83, 191, 234, 92, 241, 237, 148, 48, 86, 136, 50, 53, 17, 84, 222, 94, 44, 114, 1, 126, 76, 135, 35, 115, 245, 62, 226, 40, 112, 189, 205, 187, 27, 20, 93, 177, 26, 198, 181, 200, 195, 107, 105, 185, 110, 252, 58, 167, 163, 170, 5, 192, 15, 106, 4, 232, 118, 29, 169, 223, 196, 213, 113, 108, 228, 7, 41, 61, 188, 88, 14, 78, 207, 145, 42, 236, 71, 131, 59, 147, 162, 253, 174, 55, 127, 124, 209, 216, 81, 130, 193, 215, 79, 12, 168, 164, 49, 179, 97, 70, 141, 54, 180, 230, 235, 128, 137, 242, 146, 199]

DB_1=[0, 14, 37, 168, 28, 125, 171, 32, 124, 135, 23, 71, 162, 169, 161, 134, 190, 157, 30, 188, 58, 158, 67, 51, 246, 50, 198, 193, 199, 200, 182, 70, 127, 167, 221, 103, 92, 48, 86, 152, 205, 186, 107, 160, 1, 136, 145, 137, 79, 122, 255, 78, 166, 195, 249, 61, 49, 45, 228, 177, 219, 18, 12, 140, 3, 132, 83, 192, 202, 130, 123, 89, 120, 183, 241, 66, 207, 112, 159, 242, 187, 17, 214, 15, 80, 119, 26, 110, 76, 175, 250, 69, 72, 77, 252, 233, 75, 33, 148, 146, 129, 105, 173, 232, 176, 104, 172, 216, 95, 36, 40, 8, 191, 4, 239, 41, 240, 106, 194, 244, 97, 52, 16, 102, 60, 34, 253, 155, 5, 227, 223, 101, 91, 154, 139, 225, 88, 218, 224, 179, 19, 9, 93, 254, 11, 109, 164, 210, 17, 46, 245, 251, 74, 24, 43, 68, 25, 151, 133, 42, 111, 47, 22, 57, 141, 63, 38, 206, 156, 180, 247, 31, 113, 20, 56, 211, 235, 208, 128, 10, 163, 213, 13, 99, 215, 100, 236, 184, 185, 209, 55, 126, 29, 222, 220, 85, 143, 96, 138, 53, 2, 116, 59, 131, 217, 226, 98, 231, 181, 54, 114, 142, 153, 147, 94, 44, 7, 39, 234, 197, 21, 118, 174, 204, 144, 196, 81, 243, 87, 150, 178, 62, 229, 108, 165, 65, 237, 230, 170, 6, 84, 82, 149, 212, 189, 35, 203, 27, 90, 115, 248, 64, 201, 121, 73, 238]

DB_2=[0, 14, 37, 168, 28, 125, 171, 32, 124, 135, 23, 71, 162, 169, 161, 134, 190, 157, 30, 188, 58, 158, 67, 51, 246, 50, 198, 193, 199, 200, 182, 70, 127, 167, 221, 103, 92, 48, 86, 152, 205, 186, 107, 160, 1, 136, 145, 137, 79, 122, 255, 78, 166, 195, 249, 61, 49, 45, 228, 177, 219, 18, 12, 140, 3, 132, 83, 192, 202, 130, 123, 89, 120, 183, 241, 66, 207, 112, 159, 242, 187, 17, 214, 15, 80, 119, 26, 110, 76, 175, 250, 69, 72, 77, 252, 233, 75, 33, 148, 146, 129, 105, 173, 232, 176, 104, 172, 216, 95, 36, 40, 8, 191, 4, 239, 41, 240, 106, 194, 244, 97, 52, 16, 102, 60, 34, 253, 155, 5, 227, 223, 101, 91, 154, 139, 225, 88, 218, 224, 179, 19, 9, 93, 254, 11, 109, 164, 210, 117, 46, 245, 251, 74, 24, 43, 68, 25, 151, 133, 42, 111, 47, 22, 57, 141, 63, 38, 206, 156, 180, 247, 31, 113, 20, 56, 211, 235, 208, 128, 10, 163, 213, 13, 99, 215, 100, 236, 184, 185, 209, 55, 126, 29, 222, 220, 85, 143, 96, 138, 53, 2, 116, 59, 131, 217, 226, 98, 231, 181, 54, 114, 142, 153, 147, 94, 44, 7, 39, 234, 197, 21, 118, 174, 204, 144, 196, 81, 243, 87, 150, 178, 62, 229, 108, 165, 65, 237, 230, 170, 6, 84, 82, 149, 212, 189, 35, 203, 27, 90, 115, 248, 64, 201, 121, 73, 238]

DB_3=[0, 18, 111, 227, 36, 135, 230, 96, 132, 146, 57, 201, 253, 224, 248, 145, 217, 188, 34, 223, 78, 185, 197, 85, 1, 86, 81, 88, 82, 67, 193, 202, 129, 242, 124, 169, 228, 80, 250, 179, 76, 213, 189, 251, 3, 131, 168, 128, 209, 142, 26, 210, 241, 94, 16, 71, 83, 119, 55, 200, 118, 54, 20, 143, 5, 151, 245, 91, 69, 157, 141, 235, 136, 194, 8, 198, 74, 144, 186, 13, 214, 51, 97, 17, 240, 153, 46, 178, 212, 234, 21, 207, 216, 215, 31, 32, 221, 99, 167, 173, 152, 187, 236, 35, 203, 184, 239, 115, 225, 108, 120, 24, 218, 12, 42, 123, 11, 190, 93, 7, 163, 92, 48, 170, 68, 102, 28, 182, 15, 62, 122, 175, 237, 181, 134, 56, 232, 117, 59, 206, 53, 27, 231, 25, 29, 183, 247, 109, 159, 114, 4, 22, 222, 40, 125, 204, 43, 162, 148, 126, 177, 113, 58, 75, 140, 65, 106, 73, 191, 199, 2, 33, 147, 60, 72, 110, 38, 107, 155, 30, 254, 100, 23, 165, 98, 172, 47, 211, 208, 104, 89, 130, 39, 121, 127, 255, 138, 160, 133, 95, 6, 156, 77, 158, 112, 61, 166, 50, 196, 90, 150, 137, 176, 174, 226, 116, 9, 105, 37, 84, 63, 154, 233, 79, 171, 87, 243, 14, 249, 161, 205, 66, 52, 180, 244, 195, 44, 49, 229, 10, 252, 246, 164, 103, 220, 101, 70, 45, 238, 149, 19, 192, 64, 139, 219, 41]

DB_4=[0, 209, 87, 103, 113, 169, 206, 56, 71, 127, 83, 3, 158, 236, 94, 134, 88, 86, 231, 136, 198, 241, 49, 68, 116, 254, 141, 143, 186, 73, 240, 47, 14, 175, 108, 29, 207, 15, 160, 13, 135, 235, 147, 22, 85, 95, 42, 173, 232, 142, 174, 90, 33, 194, 40, 125, 139, 251, 162, 183, 72, 167, 53, 18, 43, 218, 104, 234, 239, 193, 35, 61, 201, 132, 192, 137, 65, 204, 37, 96, 179, 177, 215, 166, 39, 92, 107, 50, 170, 208, 81, 238, 99, 59, 91, 121, 156, 24, 196, 146, 106, 41, 131, 109, 74, 118, 70, 100, 80, 205, 114, 62, 32, 119, 57, 77, 250, 247, 45, 249, 101, 171, 154, 60, 237, 69, 129, 213, 195, 126, 130, 8, 223, 110, 76, 248, 159, 191, 227, 6, 200, 115, 220, 212, 12, 253, 9, 46, 112, 44, 55, 222, 181, 31, 246, 75, 140, 185, 19, 28, 199, 89, 84, 214, 67, 23, 122, 144, 168, 66, 244, 20, 117, 11, 58, 123, 30, 128, 161, 255, 165, 150, 221, 16, 17, 97, 245, 98, 157, 64, 111, 149, 176, 102, 7, 219, 216, 226, 182, 178, 180, 230, 82, 34, 48, 63, 124, 190, 148, 151, 202, 4, 210, 217, 164, 52, 145, 242, 38, 26, 93, 172, 211, 155, 163, 187, 54, 10, 153, 203, 27, 133, 138, 78, 5, 21, 224, 51, 243, 152, 197, 184, 233, 229, 105, 225, 79, 36, 120, 188, 189, 2, 25, 252, 1, 228]

DB_5=[0, 209, 87, 103, 113, 169, 206, 56, 71, 127, 83, 3, 158, 236, 94, 134, 88, 86, 231, 136, 198, 241, 49, 68, 116, 254, 141, 143, 186, 73, 240, 47, 14, 175, 108, 29, 207, 15, 160, 13, 135, 235, 147, 22, 85, 95, 42, 173, 232, 142, 174, 90, 33, 194, 40, 125, 139, 251, 162, 183, 72, 167, 53, 18, 43, 218, 104, 234, 239, 193, 35, 61, 201, 132, 192, 137, 65, 204, 37, 96, 179, 177, 215, 166, 39, 92, 107, 50, 170, 208, 81, 238, 99, 59, 91, 121, 156, 24, 196, 146, 106, 41, 131, 109, 74, 118, 70, 100, 80, 205, 114, 62, 32, 119, 57, 77, 250, 247, 45, 249, 101, 171, 154, 60, 237, 69, 129, 213, 195, 126, 130, 8, 223, 110, 76, 248, 159, 191, 227, 6, 200, 115, 220, 212, 12, 253, 9, 46, 112, 44, 55, 222, 181, 31, 246, 75, 140, 185, 19, 28, 199, 89, 84, 214, 67, 23, 122, 144, 168, 66, 244, 20, 117, 11, 58, 123, 30, 128, 161, 255, 165, 150, 221, 16, 17, 97, 245, 98, 157, 64, 111, 149, 176, 102, 7, 219, 216, 226, 182, 178, 180, 230, 82, 34, 48, 63, 124, 190, 148, 151, 202, 4, 210, 217, 164, 52, 145, 242, 38, 26, 93, 172, 211, 155, 163, 187, 54, 10, 153, 203, 27, 133, 138, 78, 5, 21, 224, 51, 243, 152, 197, 184, 233, 229, 105, 225, 79, 36, 120, 188, 189, 2, 25, 252, 1, 228]

DB_6=[0, 104, 249, 169, 147, 224, 73, 72, 201, 129, 245, 5, 185, 47, 226, 145, 232, 250, 50, 131, 81, 8, 83, 204, 156, 25, 140, 138, 213, 219, 11, 113, 18, 234, 180, 39, 74, 17, 251, 23, 146, 38, 174, 58, 255, 225, 126, 236, 35, 137, 233, 238, 99, 93, 120, 135, 134, 22, 253, 194, 216, 242, 95, 54, 125, 117, 184, 37, 42, 88, 101, 71, 64, 151, 91, 128, 195, 79, 111, 160, 206, 200, 98, 241, 105, 228, 189, 86, 229, 107, 243, 41, 165, 77, 237, 139, 191, 40, 87, 173, 190, 123, 158, 183, 222, 154, 202, 172, 240, 76, 150, 66, 96, 153, 75, 215, 21, 2, 119, 16, 175, 230, 181, 68, 44, 207, 152, 100, 94, 130, 157, 24, 122, 178, 212, 19, 186, 218, 62, 10, 67, 149, 127, 103, 20, 28, 27, 114, 144, 116, 89, 121, 196, 33, 1, 221, 143, 208, 53, 36, 82, 235, 252, 97, 197, 57, 142, 171, 227, 198, 7, 60, 159, 29, 78, 141, 34, 155, 248, 26, 244, 161, 124, 48, 51, 163, 4, 166, 188, 192, 177, 164, 203, 170, 9, 118, 115, 61, 193, 205, 199, 49, 246, 102, 80, 65, 132, 217, 167, 162, 69, 12, 109, 112, 247, 92, 168, 13, 106, 46, 231, 239, 110, 182, 254, 214, 90, 30, 176, 70, 45, 148, 133, 210, 15, 63, 59, 85, 14, 179, 84, 211, 32, 52, 187, 56, 209, 108, 136, 223, 220, 6, 43, 31, 3, 55]

DB_7=[0, 185, 174, 206, 226, 73, 135, 112, 142, 254, 166, 6, 39, 195, 188, 23, 176, 172, 213, 11, 151, 249, 98, 136, 232, 231, 1, 5, 111, 146, 251, 94, 28, 69, 216, 58, 133, 30, 91, 26, 21, 205, 61, 44, 170, 190, 84, 65, 203, 7, 71, 180, 66, 159, 80, 250, 13, 237, 95, 117, 144, 85, 106, 36, 86, 175, 208, 207, 197, 153, 70, 122, 137, 19, 155, 9, 130, 131, 74, 192, 125, 121, 181, 87, 78, 184, 214, 100, 79, 187, 162, 199, 198, 118, 182, 242, 35, 48, 147, 63, 212, 82, 29, 218, 148, 236, 140, 200, 160, 129, 228, 124, 64, 238, 114, 154, 239, 245, 90, 233, 202, 77, 47, 120, 193, 138, 25, 177, 157, 252, 31, 16, 165, 220, 152, 235, 37, 101, 221, 12, 139, 230, 163, 179, 24, 225, 18, 92, 224, 88, 110, 167, 113, 62, 247, 150, 3, 105, 38, 56, 149, 178, 168, 183, 134, 46, 244, 59, 75, 132, 243, 40, 234, 22, 116, 246, 60, 27, 89, 229, 81, 55, 161, 32, 34, 194, 241, 196, 33, 128, 222, 49, 123, 204, 14, 173, 171, 223, 119, 127, 115, 215, 164, 68, 96, 126, 248, 103, 51, 53, 143, 8, 191, 169, 83, 104, 57, 255, 76, 52, 186, 67, 189, 45, 93, 109, 108, 20, 41, 141, 54, 17, 15, 156, 10, 42, 219, 102, 253, 43, 145, 107, 201, 209, 210, 217, 158, 72, 240, 99, 97, 4, 50, 227, 2, 211]

DB_8=[0, 158, 136, 87, 161, 206, 153, 194, 133, 71, 157, 2, 6, 165, 121, 22, 130, 100, 186, 240, 132, 76, 51, 135, 88, 70, 9, 231, 193, 99, 160, 216, 230, 53, 72, 233, 117, 10, 63, 228, 250, 178, 226, 246, 102, 149, 33, 219, 176, 11, 217, 108, 62, 145, 207, 169, 242, 191, 209, 37, 143, 40, 38, 227, 205, 129, 93, 94, 167, 147, 208, 59, 142, 248, 127, 28, 126, 119, 43, 64, 48, 222, 101, 196, 197, 151, 95, 49, 204, 114, 115, 75, 66, 192, 128, 188, 232, 16, 106, 14, 179, 35, 239, 164, 97, 182, 105, 85, 159, 155, 163, 57, 210, 90, 46, 118, 83, 183, 54, 81, 185, 32, 19, 215, 73, 107, 1, 139, 125, 171, 3, 29, 120, 166, 154, 189, 234, 56, 175, 251, 98, 79, 122, 103, 8, 68, 241, 52, 77, 218, 200, 148, 203, 7, 91, 141, 229, 195, 15, 5, 104, 110, 138, 137, 144, 26, 190, 224, 34, 124, 181, 24, 180, 31, 44, 82, 235, 237, 211, 170, 198, 27, 150, 13, 225, 172, 89, 174, 4, 146, 74, 25, 50, 187, 23, 109, 111, 67, 201, 220, 39, 86, 113, 60, 223, 213, 69, 212, 245, 247, 140, 21, 156, 131, 42, 202, 12, 78, 41, 254, 123, 55, 112, 255, 61, 45, 36, 243, 17, 96, 18, 20, 30, 116, 249, 244, 173, 221, 162, 253, 134, 47, 92, 84, 177, 65, 152, 199, 80, 58, 214, 238, 252, 168, 236, 184]

DB_9=[0, 185, 131, 249, 248, 73, 176, 93, 148, 201, 188, 6, 10, 244, 139, 58, 157, 172, 213, 11, 151, 212, 85, 146, 232, 202, 27, 50, 88, 165, 251, 115, 49, 95, 216, 32, 159, 30, 65, 55, 21, 205, 61, 1, 170, 164, 99, 118, 203, 29, 112, 180, 66, 168, 74, 224, 13, 218, 104, 111, 138, 120, 106, 62, 76, 152, 231, 226, 242, 174, 107, 77, 137, 19, 129, 36, 130, 153, 125, 192, 80, 121, 175, 87, 84, 162, 225, 83, 79, 150, 149, 221, 198, 91, 155, 223, 35, 48, 190, 18, 206, 101, 42, 247, 163, 193, 187, 255, 186, 182, 254, 75, 109, 238, 114, 154, 245, 194, 90, 243, 208, 96, 53, 98, 219, 189, 3, 134, 135, 230, 5, 39, 136, 241, 181, 220, 37, 72, 234, 22, 166, 209, 142, 169, 24, 204, 8, 92, 215, 117, 67, 167, 70, 9, 237, 140, 52, 94, 17, 15, 184, 178, 133, 128, 171, 46, 217, 59, 102, 132, 196, 40, 199, 33, 116, 246, 38, 44, 110, 229, 81, 45, 161, 23, 56, 239, 235, 233, 12, 173, 222, 43, 86, 214, 57, 183, 177, 197, 64, 127, 105, 250, 147, 68, 122, 100, 207, 103, 4, 2, 143, 63, 191, 158, 126, 69, 20, 210, 123, 25, 141, 89, 144, 26, 71, 119, 108, 14, 51, 160, 54, 60, 34, 156, 16, 7, 236, 124, 253, 28, 145, 113, 228, 252, 200, 195, 179, 82, 240, 78, 97, 41, 31, 227, 47, 211]

DB_10=[0, 39, 11, 174, 89, 135, 41, 159, 17, 142, 33, 4, 12, 81, 242, 44, 31, 200, 111, 251, 19, 152, 102, 21, 176, 140, 18, 213, 153, 198, 91, 171, 215, 106, 144, 201, 234, 20, 126, 211, 239, 127, 223, 247, 204, 49, 66, 173, 123, 22, 169, 216, 124, 57, 133, 73, 255, 101, 185, 74, 5, 80, 76, 221, 129, 25, 186, 188, 85, 61, 187, 118, 7, 235, 254, 56, 252, 238, 86, 128, 96, 167, 202, 147, 145, 53, 190, 98, 131, 228, 230, 150, 132, 155, 27, 99, 203, 32, 212, 28, 125, 70, 197, 83, 194, 119, 210, 170, 37, 45, 93, 114, 191, 180, 92, 236, 166, 117, 108, 162, 105, 64, 38, 181, 146, 214, 2, 13, 250, 77, 6, 58, 240, 87, 47, 97, 207, 112, 69, 237, 196, 158, 244, 206, 16, 136, 249, 104, 154, 175, 139, 51, 141, 14, 182, 1, 209, 157, 30, 10, 208, 220, 15, 9, 59, 52, 103, 219, 68, 248, 113, 48, 115, 62, 88, 164, 205, 193, 189, 79, 151, 54, 55, 26, 217, 67, 178, 71, 8, 63, 148, 50, 100, 109, 46, 218, 222, 134, 137, 163, 78, 172, 226, 120, 165, 177, 138, 179, 241, 245, 3, 42, 35, 29, 84, 143, 24, 156, 82, 231, 246, 110, 224, 229, 122, 90, 72, 253, 34, 192, 36, 40, 60, 232, 233, 243, 65, 161, 95, 225, 23, 94, 184, 168, 121, 130, 43, 149, 160, 116, 183, 199, 227, 75, 195, 107]

DB_11=[0, 158, 136, 87, 161, 206, 153, 194, 133, 71, 157, 2, 6, 165, 121, 22, 130, 100, 186, 240, 132, 76, 51, 135, 88, 70, 9, 231, 193, 99, 160, 216, 230, 53, 72, 233, 117, 10, 63, 228, 250, 178, 226, 246, 102, 149, 33, 219, 176, 11, 217, 108, 62, 145, 207, 169, 242, 191, 209, 37, 143, 40, 38, 227, 205, 129, 93, 94, 167, 147, 208, 59, 142, 248, 127, 28, 126, 119, 43, 64, 48, 222, 101, 196, 197, 151, 95, 49, 204, 114, 115, 75, 66, 192, 128, 188, 232, 16, 106, 14, 179, 35, 239, 164, 97, 182, 105, 85, 159, 155, 163, 57, 210, 90, 46, 118, 83, 183, 54, 81, 185, 32, 19, 215, 73, 107, 1, 139, 125, 171, 3, 29, 120, 166, 154, 189, 234, 56, 175, 251, 98, 79, 122, 103, 8, 68, 241, 52, 77, 218, 200, 148, 203, 7, 91, 141, 229, 195, 15, 5, 104, 110, 138, 137, 144, 26, 190, 224, 34, 124, 181, 24, 180, 31, 44, 82, 235, 237, 211, 170, 198, 27, 150, 13, 225, 172, 89, 174, 4, 146, 74, 25, 50, 187, 23, 109, 111, 67, 201, 220, 39, 86, 113, 60, 223, 213, 69, 212, 245, 247, 140, 21, 156, 131, 42, 202, 12, 78, 41, 254, 123, 55, 112, 255, 61, 45, 36, 243, 17, 96, 18, 20, 30, 116, 249, 244, 173, 221, 162, 253, 134, 47, 92, 84, 177, 65, 152, 199, 80, 58, 214, 238, 252, 168, 236, 184]

DB_12=[0, 254, 176, 73, 61, 245, 188, 201, 137, 64, 168, 83, 71, 41, 134, 78, 203, 182, 74, 51, 140, 62, 255, 218, 35, 69, 45, 120, 159, 244, 56, 187, 125, 184, 42, 23, 186, 123, 195, 46, 72, 98, 105, 116, 229, 128, 165, 237, 49, 126, 190, 158, 198, 148, 240, 21, 96, 91, 150, 177, 242, 136, 231, 108, 163, 157, 50, 100, 122, 199, 147, 215, 247, 27, 193, 53, 196, 233, 222, 2, 169, 252, 179, 142, 139, 211, 97, 172, 166, 248, 253, 124, 81, 154, 152, 13, 18, 9, 217, 111, 103, 246, 80, 44, 167, 118, 143, 26, 251, 239, 110, 132, 192, 112, 207, 236, 93, 115, 238, 14, 28, 160, 95, 209, 47, 220, 5, 230, 146, 70, 86, 48, 131, 127, 234, 8, 65, 129, 82, 77, 241, 104, 208, 224, 40, 22, 54, 189, 59, 232, 178, 133, 228, 66, 117, 161, 43, 204, 106, 17, 138, 205, 227, 181, 145, 114, 94, 58, 243, 151, 32, 33, 37, 99, 156, 88, 68, 3, 197, 67, 221, 119, 214, 57, 63, 4, 38, 87, 20, 194, 121, 36, 250, 79, 75, 155, 200, 84, 183, 175, 226, 76, 174, 149, 249, 130, 19, 135, 34, 113, 164, 24, 173, 206, 219, 225, 60, 109, 141, 92, 213, 235, 171, 89, 144, 153, 180, 101, 12, 162, 90, 29, 102, 191, 30, 39, 1, 170, 107, 10,223, 202, 55, 31,52, 7, 185, 216, 11, 210, 212, 85, 15, 16, 6, 25]

DB_13=[0, 93, 41, 135, 223, 166, 33, 142, 7, 137, 57, 98, 122, 199, 13, 116, 123, 45, 133, 34, 1, 221, 170, 101, 203, 143, 54, 80, 234, 81, 217, 210, 86, 208, 197, 26, 37, 82, 130, 52, 112, 181, 78, 88, 79, 9, 198, 182, 215, 84, 212, 29, 132, 17, 160, 239, 64, 155, 228, 222, 85, 240, 186, 72, 194, 31, 213, 177, 165, 115, 226, 154, 83, 18, 119, 38, 113, 71, 148, 245, 206, 168, 43, 244, 242, 107, 183, 200, 196, 89, 95, 161, 151, 236, 25, 255, 28, 14, 103, 74, 179, 164, 96, 193, 51, 173, 3, 229, 91, 67, 189, 248, 128, 169, 138, 65, 159, 171, 180, 253, 225, 192, 106, 158, 195, 97, 6, 77, 21, 141, 100, 32, 11, 163, 69, 249, 126, 254, 149, 118, 87, 185, 105, 73, 48, 237, 36, 214, 219, 176, 220, 15, 184, 124, 175, 55, 50, 136, 76, 30, 5, 127, 75, 47, 23, 92, 157, 44, 162, 19, 201, 62, 207, 66, 232, 153, 120, 2, 134, 139, 150, 90, 109, 46, 42, 241, 205, 147, 24, 117, 167, 56, 172, 131, 114, 27, 121, 145, 218, 202, 188, 129, 61, 230, 174, 252, 235, 250, 60, 94, 49, 16, 63, 125, 146, 190, 40, 191, 246, 104, 111, 178, 59, 110, 224, 238, 216, 70, 8, 53, 108, 22, 68, 35, 20, 58, 247, 204, 187, 12, 99, 140, 211, 227, 209, 243, 39, 144, 251, 156, 152, 102, 10, 233, 4, 231]

DB_14=[0, 163, 153, 206, 226, 83, 157, 71, 142, 201, 145, 49, 61, 238, 139, 58, 176, 155, 207, 17, 141, 227, 85, 191, 232, 202, 27, 40, 117, 165, 225, 105, 43, 104, 239, 13, 159, 41, 65, 26, 56, 215, 39, 44, 170, 137, 99, 91, 230, 42, 106, 131, 66, 133, 80, 250, 32, 192, 114, 111, 167, 120, 93, 36, 97, 130, 231, 213, 223, 180, 113, 77, 164, 9, 182, 19, 181, 174, 74, 247, 103, 84, 152, 122, 121, 184, 214, 100, 98, 161, 162, 221, 198, 118, 129, 242, 14, 7, 190, 37, 212, 82, 48, 237, 148, 219, 140, 255, 160, 172, 211, 124, 64, 217, 69, 173, 194, 216, 90, 243, 253, 96, 53, 79, 236, 189, 3, 171, 135, 203, 50, 16, 136, 220, 175, 241, 63, 127, 199, 59, 166, 209, 185, 169, 24, 251, 18, 107, 224, 88, 110, 138, 92, 62, 218, 150, 25, 68, 38, 15, 143, 178, 168, 154, 134, 46, 195, 22, 81, 132, 233, 31, 234, 33, 116, 193, 60, 1, 67, 200, 75, 45, 187, 23, 21, 245, 235, 196, 12, 183, 222, 28, 86, 204, 57, 128, 177, 197, 109, 101, 94, 205, 147, 115, 87, 126, 248, 125, 30, 47, 149, 8, 146, 179, 73, 95, 20, 210, 123, 52, 186, 89, 144, 55, 112, 119, 108, 35, 4, 151, 54, 11, 34, 156, 10, 29, 246, 102, 208, 6, 188, 70, 228, 252, 229, 244, 158, 72, 240, 78, 76, 51, 5, 249, 2, 254]

DB_15=[0, 163, 153, 206, 226, 83, 157, 71, 142, 201, 145, 49, 61, 238, 139, 58, 176, 155, 207, 17, 141, 227, 85, 191, 232, 202, 27, 40, 117, 165, 225, 105, 43, 104, 239, 13, 159, 41, 65, 26, 56, 215, 39, 44, 170, 137, 99, 91, 230, 42, 106, 131, 66, 133, 80, 250, 32, 192, 114, 111, 167, 120, 93, 36, 97, 130, 231, 213, 223, 180, 113, 77, 164, 9, 182, 19, 181, 174, 74, 247, 103, 84, 152, 122, 121, 184, 214, 100, 98, 161, 162, 221, 198, 118, 129, 242, 14, 7, 190, 37, 212, 82, 48, 237, 148, 219, 140, 255, 160, 172, 211, 124, 64, 217, 69, 173, 194, 216, 90, 243, 253, 96, 53, 79, 236, 189, 3, 171, 135, 203, 50, 16, 136, 220, 175, 241, 63, 127, 199, 59, 166, 209, 185, 169, 24, 251, 18, 107, 224, 88, 110, 138, 92, 62, 218, 150, 25, 68, 38, 15, 143, 178, 168, 154, 134, 46, 195, 22, 81, 132, 233, 31, 234, 33, 116, 193, 60, 1, 67, 200, 75, 45, 187, 23, 21, 245, 235, 196, 12, 183, 222, 28, 86, 204, 57, 128, 177, 197, 109, 101, 94, 205, 147, 115, 87, 126, 248, 125, 30, 47, 149, 8, 146, 179, 73, 95, 20, 210, 123, 52, 186, 89, 144, 55, 112, 119, 108, 35, 4, 151, 54, 11, 34, 156, 10, 29, 246, 102, 208, 6, 188, 70, 228, 252, 229, 244, 158, 72, 240, 78, 76, 51, 5, 249, 2, 254]

Test Code

The following test code can be used to compare the outputs from the two exemplary implementations to the conventional AES (in counter mode) implementation to verify that they produce the same ultimate result.

```
def test( ):
    Input = range(256)
    Output = range(256)
    Seed = range(16)
    for i in range(16):
        Seed[i] = 0
    print Seed
    print "\nClassic AES"
    AES_CTR_MODE(KeyShcheduled, Seed, Input, Output, 256)
    print Output
    print "\nAES with idea in Section V"
    NextState32B = range(4)
    for i in range(16):
        Seed[i] = 0
    AES_PRECOMPUTSATION_SECTIONV(Seed, NextState32B, KeyShcheduled)
    AES_CTR_MODE_PRECOMPUTSATION_SECTIONV(KeyShcheduled, Seed,
NextState32B, Input, Output, 256)
    print Output
    print "\nAES with idea in Section VI"
    tmp8B_2 = range(16)
    DB_0 = range(256)
    DB_1 = range(256)
    DB_2 = range(256)
    DB_3 = range(256)
    DB_4 = range(256)
    DB_5 = range(256)
    DB_6 = range(256)
    DB_7 = range(256)
    DB_8 = range(256)
    DB_9 = range(256)
    DB_10 = range(256)
    DB_11 = range(256)
    DB_12 = range(256)
    DB_13 = range(256)
    DB_14 = range(256)
    DB_15 = range(256)
    for i in range(16):
        Seed[i] = 0
    AES_PRECOMPUTSATION_SECTION_VI(Seed, DB_0, DB_1, DB_2, DB_3,
DB_4, DB_5, DB_6, DB_7, DB_8, DB_9, DB_10, DB_11, DB_12, DB_13, DB_14,
DB_15, tmp8B_2, KeyShcheduled)
    AES_CTR_MODE_PRECOMPUTSATION_SECTION_VI(KeyShcheduled,
DB_0, DB_1, DB_2, DB_3, DB_4, DB_5, DB_6, DB_7, DB_8, DB_9, DB_10,
DB_11, DB_12, DB_13, DB_14, DB_15, tmp8B_2, Input, Output, 256)
    print Output
    print "\nDB tables for Key = {0} and Seed = {0}"
    print "\nDB_0 = "
    print DB_0
    print "\nDB_1 = "
    print DB_1
    print "\nDB_2 = "
    print DB_2
    print "\nDB_3 = "
    print DB_3
    print "\nDB_4 = "
    print DB_4
    print "\nDB_5 = "
    print DB_5
    print "\nDB_6 = "
    print DB_6
    print "\nDB_7 = "
    print DB_7
    print "\nDB_8 = "
    print DB_8
    print "\nDB_9 = "
    print DB_9
    print "\nDB_10 = "
    print DB_10
    print "\nDB_11 = "
    print DB_11
    print "\nDB_12 = "
    print DB_12
    print "\nDB_13 = "
    print DB_13
    print "\nDB_14 = "
    print DB_14
    print "\nDB_15 = "
    print DB_15
    return
test( )
```

Exemplary Data Processing Systems

Figure 5:
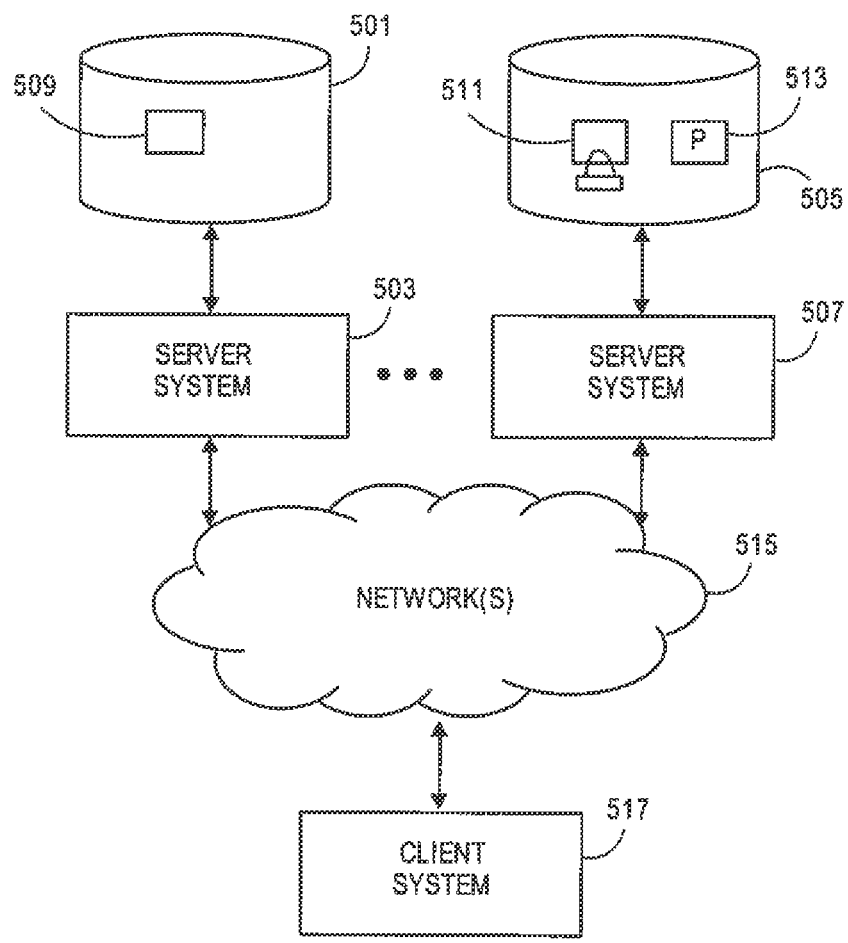
FIG. 5 shows a system of networked data processing systems of one embodiment described herein.

The various embodiments described herein can be implemented in a variety of data processing systems which can be distributed across and connected to one or more networks. In one embodiment, one or more server systems can encrypt the content and precompute the internal states for later use by one or more client systems which can retrieve the encrypted content and the precomputed internal states. The one or more client systems can then decrypt the encrypted content using the precomputed internal states, and the decryption process will use and expose, at most, only a portion of the key. FIG. 5 shows an example of a system that includes one or more server systems, such as server systems 503 and 507, and one or more client systems, such as client system 517, that can be coupled together through one or more networks 515 (such as the Internet). Server system 503, in one embodiment, can be a system which encrypts content, such as content 509 stored on storage system 501 that is coupled to the server system 503. The server system 503 can perform the methods of FIGS. 2 and 3 to generate encrypted content 511 from content 509 and to generate the one or more precomputed internal states 513 corresponding to the encrypted content 511. The server system 503 can then transmit, through network(s) 515, the encrypted content 511 and one or more precomputed internal states 513 to another server system, such as server system 507 which can distribute the encrypted content 511 and one or more precomputed internal states 513 to one or more client systems, such as client system 517. The architecture shown in FIG. 5 allows a separation of functions or jobs in that server system 503 is a content "creation" system that generates encrypted content for distribution by server system 507 which performs the function of distributing that encrypted content to client systems by transmitting that encrypted content 511 and the one or more precomputed internal states 513 through the network(s) 515. The server system 507 can store the encrypted content 511 and the one or more precomputed internal states 513 on a storage system 505 that is coupled to the server system 507. The one or more client systems, such as client system 517, can retrieve the encrypted content 511 and the one or more precomputed internal states 513 by downloading or streaming the encrypted content 511 and by downloading the one or more precomputed internal states 513 through the network(s) 515. The client system 517 can then, in one embodiment, decrypt the encrypted content 511 by using the one or more precomputed internal states 513 according to the method of FIG. 4.

Figure 6:
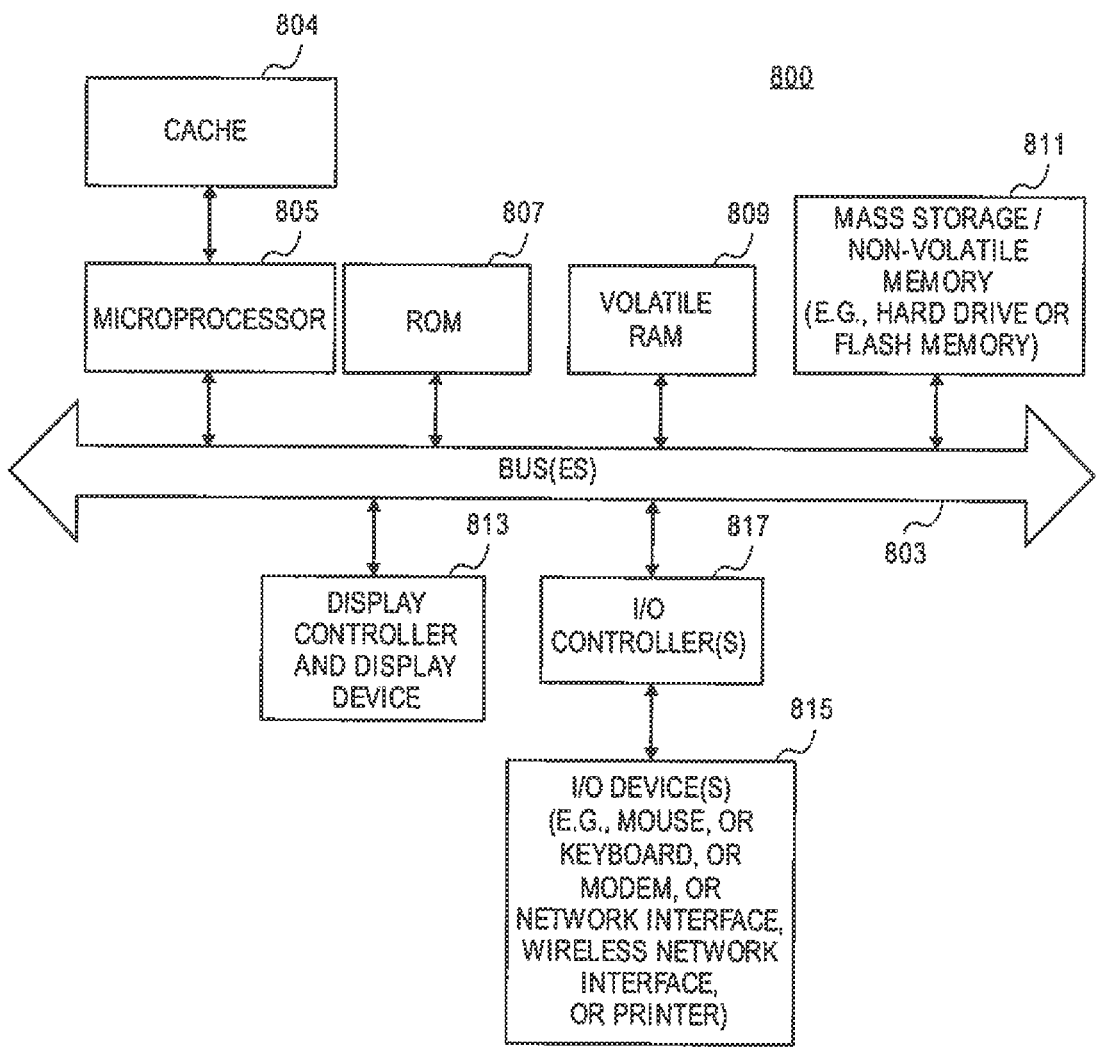
FIG. 6 shows, in a block diagram format, a data processing system that can be used with one or more embodiments described herein.

FIG. 6 shows one example of a data processing system, which may be used with any one of the embodiments described herein. Note that while FIG. 6 illustrates various components of a data processing system, it is not intended to represent any particular architecture or manner of interconnecting the components as such details are not germane to this description. It will also be appreciated that smartphones, network computers, tablet computers, laptop computers and other data processing systems which have fewer components or perhaps more components may also be used with one or more embodiments described herein.

As shown in FIG. 6, the computer system 800, which is a form of a data processing system, includes a bus 803 which is coupled to one or more microprocessor(s) 805 and a ROM (Read Only Memory) 807 and volatile RAM 809 and a non-volatile memory 811. The microprocessor 805 is coupled to optional cache 804. The microprocessor 805 may retrieve the stored instructions from one or more of the memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory. The system 800 can be a server such as server systems 503 and 507 in FIG. 5 which perform the methods of FIGS. 2 and 3, and system 800 can be one or more client systems, such as client system 517 which performs the method of FIG. 4.

The mass storage 811 is typically a magnetic hard drive or a magnetic optical drive or an optical drive or a DVD RAM or a flash memory or other types of memory system which maintain data (e.g., large amounts of data) even after power is removed from the system. Typically the mass storage 811 will also be a random access memory although this is not required. While FIG. 6 shows that the mass storage 811 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine readable non-transitory storage medium containing executable program instructions which when executed by a data processing system cause the data processing system to perform a method comprising:
generating a set of precomputed block cipher encryption values from a key and a set of nonces, the number of nonces in the set of nonces being limited to less than or equal to a number determined from a predetermined maximum plaintext length having a plurality of blocks, wherein the set of precomputed block cipher encryption values comprise a set of internal states of a block encryption algorithm;
storing the set of precomputed block cipher encryption values for use in an encryption operation, in a stream cipher mode, on plaintext; and
transmitting the set of precomputed block cipher encryption values to another data processing system wherein the transmission of the set of precomputed cipher block encryption values does not transmit an external state for at least one nonce in the set of one or more nonces;

wherein the another data processing system can decrypt the cipher text using the set of precomputed block cipher encryption values, wherein the decrypting is performed without exposing or using at least a portion of the key.

2. The medium as in claim 1, the method further comprising:
receiving plaintext having a first length which is less than the predetermined maximum plaintext length.
encrypting the plaintext using the stored set of precomputed block cipher encryption values, wherein the encrypting is performed without exposing the key; and wherein the predetermined maximum plaintext length is an assumed maximum length.

3. The medium as in claim 2 wherein the encrypting comprises XORing a block of the plaintext and a block value derived from the set of precomputed block cipher encryption values.

4. The medium as in claim 3 wherein the set of nonces comprise an initial nonce and a plurality of updated nonces derived from the initial nonce and from a plurality of counter values having, as one of the counter values, a maximum counter value that is based on a maximum number of blocks contained in the predetermined maximum plaintext length.

5. The medium as in claim 4 wherein each of the plurality of counter values modify a part of a corresponding one of the updated nonces, and wherein the part is restricted to a predetermined number of Least Significant Bytes (LSB) of the updated nonces.

6. The medium as in claim 5 wherein the set of precomputed block cipher encryption values comprise a set of internal states for each nonce of the set of nonces, and wherein each internal state, in the set of internal states, is precomputed using the key.

7. The medium as in claim 6 wherein the encrypting is performed without exposing or using the key and wherein the key is obtained from a key schedule.

8. A machine readable non-transitory storage medium containing executable program instructions which when executed by a data processing system cause the data processing system to perform a method comprising:
precomputing a set of internal states, within a symmetric key block cipher algorithm in counter mode, using a key and a set of one or more nonces, the set of internal states that are precomputed being those internal states that use the key as an input to an operation, in the symmetric key block cipher algorithm, that produces those internal states;
storing the precomputed set of internal states for use in a later encryption or decryption operation, the later encryption or decryption operation being performed without using or exposing at least a portion of the key, wherein the number of nonces in the later encryption or decryption operation is limited to a predetermined value related to a maximum plaintext length having a plurality of blocks; and
transmitting the precomputed set of internal states to a client data processing system for use in a decryption operation, wherein the transmission of the set of precomputed internal states does not transmit an external state for at least one nonce in the set of one or more nonces;
wherein the client data processing system can decrypt the cipher text using the set of precomputed internal states, wherein the decrypting is performed without exposing or using at least a portion of the key.

9. The medium as in claim 8 wherein the symmetric key block cipher algorithm is the Advanced Encryption Standard (AES) and wherein the storing of the precomputed set does not store an external output state for at least one nonce in the set of one or more nonces and wherein the later encryption or decryption operation computes the external state for a particular nonce and then encrypts a plaintext block by bitwise XORing the plaintext block with the external state for the particular nonce or decrypts a ciphertext block by bitwise XORing the ciphertext block with the external state for the particular nonce.

10. The medium as in claim 9 wherein the later encryption or decryption operation computes the external state for a particular nonce without using the key and wherein the key is obtained from a key schedule during the precomputing of the set of internal states.

11. The medium as in claim 10, the method further comprising:
transmitting ciphertext, created by the later encryption operation, to the client data processing system.

12. The medium as in claim 10 wherein the external state for a particular nonce is an output, for the particular nonce, of the AES algorithm.

13. The medium as in claim 12 wherein the set of one or more nonces comprise an initial nonce, and wherein a plurality of updated nonces are derived from the initial nonce and from a plurality of counter values, and wherein the plurality of counter values are restricted to a predetermined number of least significant bytes (LSB) of the plurality of updated nonces.

14. The medium as in claim 13 wherein the later encryption or decryption operation computes the plurality of updated nonces from the precomputed set of internal states.

15. A machine readable non-transitory storage medium containing executable program instructions which when executed by a data processing system cause the data processing system to perform a method comprising:
transmitting, to a client device, a transmission of a cipher text, the cipher text having been encrypted with a key and a set of nonces using the Advanced Encryption Standard (AES) block encryption algorithm;
transmitting, to the client device, a transmission of a set of precomputed block cipher encryption values that were precomputed using the key and the set of nonces, wherein the transmission of the set of precomputed block cipher encryption values does not transmit an external state for at least one nonce in the set of one or more nonces, wherein the set of precomputed block cipher encryption values comprise a set of internal states of the block encryption algorithm; wherein the client device can decrypt the cipher text using the set of precomputed block cipher encryption values, wherein the decrypting is performed without exposing or using at least a portion of the key.

16. The medium of claim 15, wherein the cipher text was encrypted from a plaintext having a length that is less than a predetermined maximum length.

17. The medium as in claim 16, wherein the number of nonces in the decryption operation is limited to a predetermined value related to the maximum plaintext length having a plurality of blocks.

18. The medium of claim 15, wherein the cipher text was encrypted using the set of precomputed block cipher values without exposing at least a portion of the key.

19. The medium as in claim 15 wherein the set of nonces comprise an initial nonce and a plurality of updated nonces derived from the initial nonce and from a plurality of counter values having, as one of the counter values, a maximum counter value that is based on a maximum number of blocks contained in the predetermined maximum plaintext length.

20. The medium as in claim 19 wherein each of the plurality of counter values modify a part of a corresponding one of the updated nonces, and wherein the part is restricted to a predetermined number of Least Significant Bytes (LSB) of the updated nonces.

21. The medium as in claim 20 wherein the decryption operation computes the external state for a particular nonce and then decrypts a block of cipher text by bitwise XORing the block of cipher text block with the external state for the particular nonce and wherein the plaintext has an arbitrary, unknown length of any number of blocks in the range of 2 to N blocks where N is set by the predetermined value related to the maximum plaintext length.

22. The medium as in claim 21, wherein the decryption operation computes the external state for a particular nonce without using the key.

23. The medium as in claim 22, wherein the external state for a particular nonce is an output, for the particular nonce, of the AES algorithm.

24. The medium as in claim 19, wherein the decryption operation computes the plurality of updated nonces from the precomputed set of internal states.

25. A computer-implemented method comprising:
transmitting, to at a client device, a transmission of a cipher text, the cipher text having been encrypted with a key and a set of nonces using the Advanced Encryption Standard (AES) block encryption algorithm;
transmitting, to the client device, a transmission of a set of precomputed block cipher encryption values that were precomputed using the key and the set of nonces, wherein the transmission of the set of precomputed block cipher encryption values does not transmit an external state for at least one nonce in the set of one or more nonces, wherein the set of precomputed block cipher encryption values comprise a set of internal states of the block encryption algorithm; wherein the client device can decrypt the cipher text using the set of precomputed block cipher encryption values, wherein the decrypting is performed without exposing or using at least a portion of the key.

* * * * *